United States Patent
Lee et al.

(10) Patent No.: US 12,001,017 B1
(45) Date of Patent: Jun. 4, 2024

(54) ILLUMINATION SYSTEM FOR OBJECT TRACKING

(71) Applicant: Meta Platforms Technologies, LLC, Menlo Park, CA (US)

(72) Inventors: Yun-Han Lee, Redmond, WA (US); Yu Shi, Redmond, WA (US); Lu Lu, Kirkland, WA (US); Scott Charles McEldowney, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 124 days.

(21) Appl. No.: 17/672,654

(22) Filed: Feb. 15, 2022

Related U.S. Application Data

(60) Provisional application No. 63/189,517, filed on May 17, 2021.

(51) Int. Cl.
*G02B 27/00* (2006.01)
*G02B 27/01* (2006.01)
*G06F 3/01* (2006.01)

(52) U.S. Cl.
CPC ..... *G02B 27/0093* (2013.01); *G02B 27/0172* (2013.01); *G06F 3/013* (2013.01); *G02B 2027/0138* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 10,078,220 B2 | 9/2018 | Alexander et al. | |
| 2020/0371474 A1 | 11/2020 | Ouderkirk et al. | |
| 2022/0011578 A1* | 1/2022 | Sinay | G02B 27/4205 |
| 2022/0035161 A1* | 2/2022 | Sinay | G02B 27/0172 |
| 2022/0079675 A1* | 3/2022 | Lang | G02B 30/52 |
| 2022/0099977 A1* | 3/2022 | Meitav | G02B 27/0101 |
| 2022/0201264 A1* | 6/2022 | Kirillov | G06V 40/193 |

FOREIGN PATENT DOCUMENTS

EP    3722863 A1    10/2020

OTHER PUBLICATIONS

Cheng C., et al., "Toward the Next-Generation VR/AR Optics: A Review of Holographic Near-Eye Displays from a Human-Centric Perspective," Optical Society of America, vol. 7, No. 11, Nov. 2020, pp. 1563-1578.

Khaldi A., et al., "A Laser Emitting Contact Lens for Eye Tracking," Scientific Reports, vol. 10, No. 1, 2020, 8 pages.

* cited by examiner

*Primary Examiner* — Talha M Nawaz
(74) *Attorney, Agent, or Firm* — MILLBURN IP PLLC

(57) ABSTRACT

An illumination system includes a light source configured to emit an infrared light. The illumination system also includes a substrate and a plurality of light deflecting elements coupled with the substrate and configured to deflect the infrared light to illuminate an object.

15 Claims, 21 Drawing Sheets

200

ILLUMINATION SYSTEM FOR OBJECT TRACKING

CROSS REFERENCE TO RELATED APPLICATION

This application claims the benefit of priority to U.S. Provisional Application No. 63/189,517, filed on May 17, 2021. The content of the above-mentioned application is incorporated herein by reference in its entirety.

TECHNICAL FIELD

The present disclosure relates generally to optical systems and, more specifically, to an illumination system for object tracking.

BACKGROUND

Object tracking devices, such as devices for tracking eyes and/or faces, have been implemented in a variety of technical fields, e.g., near-eye displays ("NEDs"), head-up displays ("HUDs"), head-mounted displays ("HMDs"), smart phones, laptops, televisions, vehicles, etc. For example, object tracking devices have been implemented in augmented reality ("AR"), virtual reality ("VR"), and/or mixed reality ("MR") applications. Through monitoring an eye, the surrounding region of the eye, and/or the face of a user, a three-dimensional ("3D") head pose, facial expressions, pupil positions, and eye gazes of the user may be tracked in real time, which can be used for various purposes, including, for example, adjusting display of content to the user, monitoring user's attention, physical and/or psychological status, etc.

SUMMARY OF THE DISCLOSURE

One aspect of the present disclosure provides an illumination system that includes light source configured to emit a light. The illumination system also includes a substrate and at least one light deflecting element coupled with the substrate and configured to deflect the light to illuminate an object.

Another aspect of the present disclosure provides an object tracking system. The object tracking system includes an illumination system that includes light source configured to emit a light. The illumination system also includes a substrate and at least one first light deflecting element coupled with the substrate and configured to deflect the light to illuminate an object. The object tracking system also includes an optical sensor configured to receive the light reflected by the object and generate an image of the object based on the light reflected by the object.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1A:
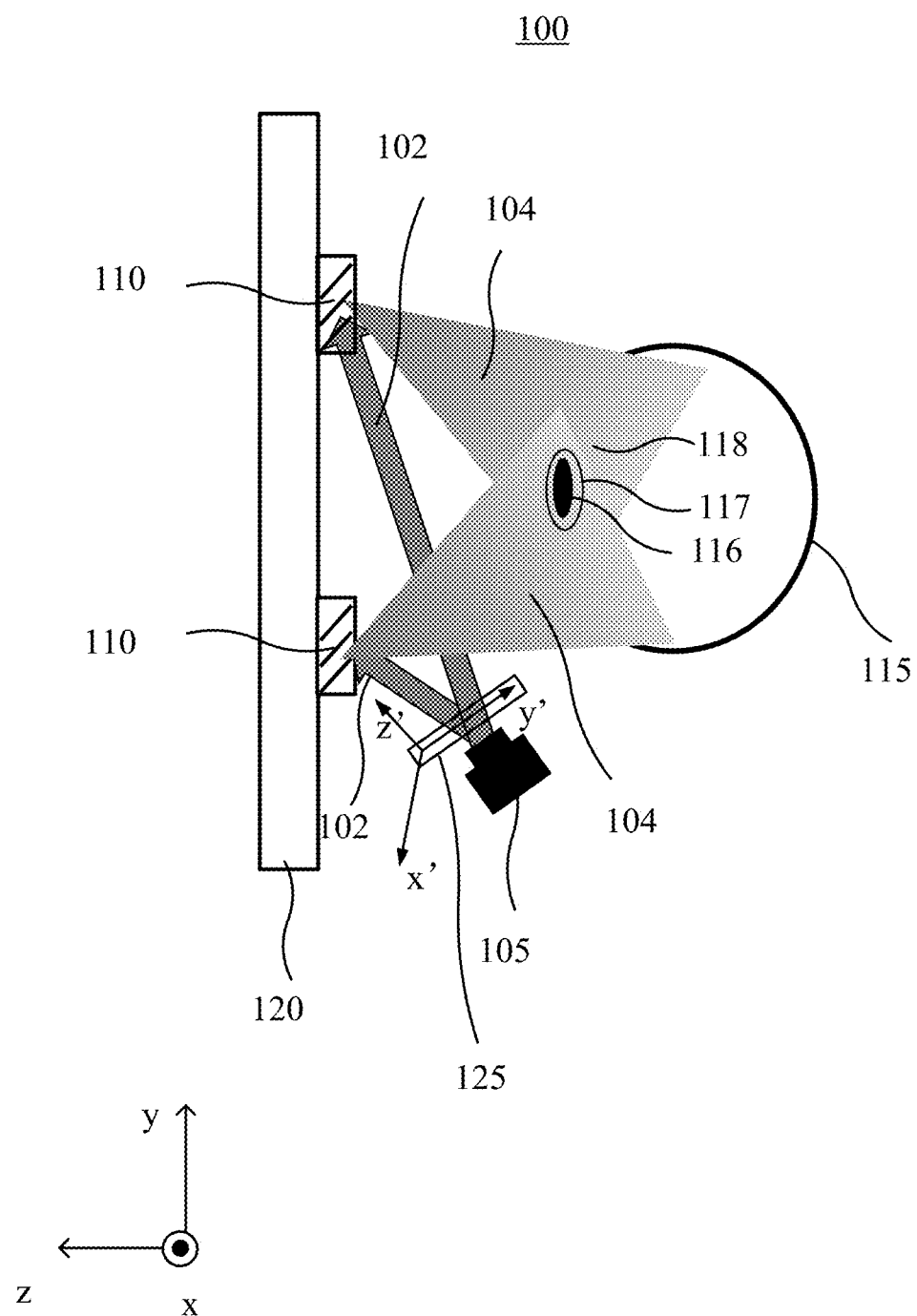
FIG. 1A illustrates a schematic diagram of an illumination system for object tracking, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable.

The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" or "out-of-plane orientation" indicates a direction or orientation that is non-parallel to the plane of the film or layer (e.g., perpendicular to the surface plane of the film or layer, e.g., perpendicular to a plane parallel to the surface plane). For example, when an "in-plane" direction or orientation refers to a direction or orientation within a surface plane, an "out-of-plane" direction or orientation may refer to a thickness direction or orientation perpendicular to the surface plane, or a direction or orientation that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights with orthogonal polarizations or two orthogonally polarized lights may be two linearly polarized lights with two orthogonal polarization directions (e.g., an x-axis direction and a y-axis direction in a Cartesian coordinate system) or two circularly polarized lights with opposite handednesses (e.g., a left handed circularly polarized light and a right handed circularly polarized light).

In the present disclosure, an angle of a beam (e.g., a diffraction angle of a diffracted beam or an incidence angle of an incident beam) with respect to a normal of a surface can be defined as a positive angle or a negative angle, depending on the angular relationship between a propagating direction of the beam and the normal of the surface. For example, when the propagating direction of the beam is clockwise from the normal, the angle of the propagating direction may be defined as a positive angle, and when the propagating direction of the beam is counter-clockwise from the normal, the angle of the propagating direction may be defined as a negative angle.

The term "substantially" or "primarily" used to modify an optical response action, such as transmit, reflect, diffract, block or the like that describes processing of a light means that a majority portion, including all, of a light is transmitted, reflected, diffracted, or blocked, etc. The majority portion may be a predetermined percentage (greater than 50%) of the entire light, such as 100%, 95%, 90%, 85%, 80%, etc., which may be determined based on specific application needs.

Eye tracking techniques have been in a variety of technical fields, e.g., near-eye displays ("NEDs"), head-up displays ("HUDs"), head-mounted displays ("HMDs"), smart phones, laptops, televisions, vehicles, etc. For example, the disclosed optical systems may be implemented in various systems for augmented reality ("AR"), virtual reality ("VR"), and/or mixed reality ("MR") applications, to determine what content to provide to the user, to solve the vergence-accommodation conflict, and/or to enable pupil steered AR, VR, and/or MR display systems (including, but not limited to, holographic near eye displays, retinal projection eyewear, and wedged light guide displays), etc.

For example, for eye tracking, a light source may emit an infrared ("IR") light to illuminate one or both eyes of a user. The IR light is invisible to the human eyes and, thus, does not distract the user during operation. A signal light deflecting element such as a grating may be arranged facing the eye, and configured to deflect the IR light reflected by the eye to an optical sensor (or an imaging device), e.g., a camera. The optical sensor may be arranged off-axis with respect to the light deflecting element and off-axis with respect to the eye (e.g., at a side of the eye, face, or user's head) to receive the deflected IR light. The optical sensor may generate a tracking signal based on the received IR light. Based on the tracking signal, the optical sensor may generate an image of the eye, which may be used to extract eye tracking information relating to the eye, such as gaze direction, movement direction, psychological state, etc. In AR and/or MR systems, due to the short eye relief distance, the light source may be disposed around the frame of glasses to provide an out-of-field illumination to the eye. Such an out-of-field illumination may be insufficient for the eye, especially for the central region of the eye. Thus, the out-of-field illumination may not provide a high eye tracking accuracy, and the eye tracking range may be small. In-field vertical-cavity surface-emitting lasers ("VCSELs") and photonic integrated circuits have been used to provide an in-field illumination to the eye. However, the fabrication complicity and cost are high a VCSEL-based illumination system. "Field" in the phrases "an out-of-field illumination" and "an in-field illumination" be referred to a field of view of an eye of a user when using a system or device including the elements that provide the out-of-field (or in-field) illumination to the eye.

In view of the limitations in the conventional technologies, the present disclosure provides an illumination system for object tracking (e.g., eye tracking and/or face tracking). The illumination system may be configured to provide an in-field illumination to an object (e.g., an eye and/or face), with a more compact and simpler structure. As a result, an object tracking system including the disclosed illumination system can be configured to provide an enhanced tracking range and an increased tracking accuracy.

In some embodiments, the illumination system may include a light source configured to emit an infrared light. The illumination system may also include a substrate and a plurality of light deflecting elements coupled with the substrate and configured to deflect the infrared light to illuminate an object. In some embodiments, the light deflecting elements are configured to deflect the infrared light to illuminate the object, and substantially transmit, with negligible deflection, a visible light. In some embodiments, the plurality of light deflecting elements are disposed at a plurality of portions of the substate along a longitudinal direction of the substrate. In some embodiments, the illumination system further includes a light splitting element optically coupled with the light source and configured to split the infrared light emitted by the light source into a plurality of infrared lights propagating toward the plurality of light deflecting elements.

In some embodiments, the light splitting element includes a plurality of one-dimensional ("1D") grating or one or more two-dimensional ("2D") gratings. In some embodiments, the illumination system also includes a retardation film stacked with a light deflecting element of the plurality of light deflecting elements and configured to control a polarization of the infrared light deflected by the light deflecting element for illuminating the object. In some embodiments, the illumination system also includes a beam shaping element stacked with a light deflecting element of the plurality of light deflecting elements, and configured to convert the infrared light deflected by the light deflecting element into a structured infrared light for illuminating the object. In some embodiments, the structured infrared light includes at least one of an intensity-based structured infrared light or a polarization-based structured infrared light. In some embodiments, the light deflecting element and the beam shaping element are integrally formed in a single hologram.

In some embodiments, the substrate is a light guide, and the illumination system further includes an in-coupling element coupled with the light guide. The light deflecting elements are coupled with the light guide. The in-coupling element is configured to couple the light emitted by the infrared light source into the light guide to propagate inside the light guide. The light deflecting elements are configured to couple the infrared light propagating inside the light guide output of the light guide to illuminate the object.

In some embodiments, the illumination system further includes a retardation film stacked with a light deflecting element of the plurality of light deflecting elements and configured to control a polarization of the infrared light out-coupled by the light deflecting element for illuminating the object. In some embodiments, the illumination system further includes a beam shaping element stacked with a light deflecting element of the plurality of light deflecting elements, and configured to convert the infrared light out-coupled by the light deflecting element into a structured infrared light for illuminating the object. In some embodiments, the structured infrared light includes at least one of an intensity-based structured infrared light or a polarization-based structured infrared light. In some embodiments, the light deflecting element and the beam shaping element are integrally formed in a single hologram.

In some embodiments, the plurality of light deflecting elements are coupled with the light guide at a plurality of portions of the light guide along a longitudinal direction of the light guide. The illumination system further includes a light splitting element coupled with the light guide, and configured to split the infrared light in-coupled by the in-coupling element into a plurality of infrared lights propagating toward the plurality of light deflecting elements.

In some embodiments, the light deflecting elements include at least one of a hologram optical element, a surface relief element, or a polarization volume hologram element. In some embodiments, the light deflecting elements include at least one diffractive optical element. In some embodiments, the light deflecting elements include at least one of a grating (with zero optical power) or an off-axis focusing lens (or a grating with an off-axis focus power).

In some embodiments, the present disclosure provides an object tracking system. The object tracking system includes an illumination system that includes a light source configured to emit an infrared light. The illumination system also includes a substrate and a plurality of light deflecting elements coupled with the substate and configured to deflect the infrared light to illuminate an object. The object tracking system also includes an optical sensor configured to receive the infrared light reflected by the object and generate an image of the object based on the infrared light reflected by the object. In some embodiments, the object tracking system also includes a light splitting element optically coupled with the light source and configured to split the infrared light emitted by the light source into a plurality of infrared lights propagating toward the plurality of light deflecting elements disposed at a plurality of portions of the substate along a longitudinal direction of the substrate. In some embodiments, the object tracking system also includes a retardation film coupled with a light deflecting element of the plurality of light deflecting elements, and configured to control a polarization of the infrared light deflected by the light deflecting element for illuminating the object.

Various illumination systems according to embodiments of the present disclosure will be discussed below. The illumination systems may deflect (e.g., diffract) an IR light from a light source to illuminate an object (or target) that is being tracked, such as the eye and/or face of a user. For discussion purpose, the eye is used as an example of the object that is being tracked. It is understood that the illumination systems disclosed herein may be used to track a target or an object other than the eye of the user. An object tracking system including the disclosed illumination system is referred to as an eye tracking system in the following descriptions. The eye tracking system is described herein as an example of the object tracking system including the disclosed illumination system. It is understood that the object tracking systems disclosed herein may be used to track a target or an object other than the eye of the user.

FIG. 1A schematically illustrates a y-z sectional view (e.g., a top view) of an illumination system or assembly 100 for eye tracking, according to an embodiment of the present disclosure. As shown in FIG. 1A, the illumination system 100 may include one or more light sources 105, and one or more illuminators 110 disposed at a substrate 120. The illuminator 110 may also be referred to as a light deflecting element or an illumination light deflecting element. The one or more light sources 105 may be configured to emit one or more lights 102 toward the one or more illuminators 110. The one or more illuminators 110 may be configured to forwardly or backwardly deflect, via a suitable mechanism, the one or more lights 102 as one or more deflected lights 104, which illuminate one or both eyes 115 of a person, such as a user of the eye tracking system. FIG. 1A shows one eye 115 for illustrative purposes. It is understood that the components for illuminating the eye 115 may be replicated for illuminating the other eye of the user, which are omitted in FIG. 1A. FIG. 1A shows two illuminators 110 for illustrative purposes. It is understood that any suitable number (e.g., three, four, five, etc.) of illuminators 110 may be included. A plurality of illuminators 110 (or light deflecting elements) may be distributed at different, separated portions or locations (may be on the same surface or on different surfaces) of the substrate 120 along one or more directions within a plane of the substate 120 that is perpendicular to the thickness direction (e.g., the z-axis direction) of the substrate 120. In some embodiments, the one or more directions may include a longitudinal direction (e.g., y-axis direction shown in FIG. 1A) of the substrate 120 as shown in FIG. 1A. Although the y-axis direction is shown as an example of the longitudinal direction of the substrate 120, in some embodiments, the longitudinal direction may be the x-axis direction. In some embodiments, the illuminators 110 may be distributed along two different directions within the plane of the substate 120, such as along both of the x-axis direction and the y-axis direction. In some embodiments, as shown in FIG. 1A, the two (or more) illuminators 110 may be disposed at different sides (left and right, and/or upper and lower) of a pupil 116 of the eye 115, such that a more uniform illumination of the eye 115 can be achieved. In the embodiment shown in FIG. 1A, the illuminators 110 are separated apart along the y-axis direction of the substrate 120, and are disposed at two different sides of the pupil 116.

The light source 105 may be positioned out of a line of sight of the user (e.g., above and in front of the eye 115). In some embodiments, the light source 105 may emit the light 102 in the infrared ("IR") spectrum. For example, the spectrum of the light 102 emitted by the light source 105 may be within, overlap, or encompass at least a portion of the IR spectrum. In some embodiments, the light source 105 may emit the light 102 in the near infrared ("NIR") spectrum, or any other spectrum such that the light 102 is invisible to the eye 115. IR lights are invisible to the human eyes and thus, do not distract the user during operations. In some embodiments, the light source 105 may include at least one of an IR LED or an IR laser.

The illuminator 110 may be disposed adjacent (e.g., facing) the eye 115 and the light source 105, and configured to receive the light 102 from the light source 105. In some embodiments, the eye 115 and the light source 105 may be disposed at a same side of the illuminator 110. The illuminator 110 may be configured to backwardly deflect, via a suitable mechanism, the light 102 as the reflected light 104 propagating toward the eye 115 to illuminate the eye 115, such as the pupil 116, an iris 117, a sclera 118, the entire eye 115, an area near (e.g., above, below, left to, right to, or surrounding) the eye 115, or an area including the eye 115 and the area near the eye 115, including the eye lid and/or the facial skins or other tissues around or inside the eye 115. In some embodiments, although not shown, the eye 115 and the light source 105 may be disposed at different sides of the illuminator 110. The illuminator 110 may be configured to forwardly deflect, via a suitable mechanism, the light 102 as the reflected light 104 propagating toward the eye 115 to illuminate the eye 115.

For illustrative purposes, FIG. 1A shows that the eye 115 and the light source 105 are disposed at the same side of the illuminator 110. In some embodiments, the illuminator 110 may be a diffractive optical element configured to backwardly diffract the light 102 as the diffracted light 104 propagating toward the eye 115 to illuminate the eye 115. Thus, the illuminator 110 may also be referred to as an illumination light diffracting element. In some embodiments, the illuminator 110 may include a grating configured to backwardly diffract the light 102 as the diffracted light 104 propagating toward the eye 115 to illuminate the eye 115. In some embodiments, the illuminator 110 may include an off-axis diffractive lens configured to backwardly diffract and diverge the light 102 as the divergent diffracted light 104 propagating toward the eye 115 to illuminate the eye 115. An off-axis diffractive lens may be considered as a grating with an optical power. An off-axis diffractive lens may also be referred to as an off-axis focusing diffractive lens. The off-axis focusing diffractive lens may provide off-axis focusing without tilting, or with tilting at smaller angles as compared with an on-axis focusing lenses. Thus, the off-axis focusing diffractive lens may reduce a form factor of the illumination system 100. In some embodiments, the off-axis focusing diffractive lens may perform two or more functions simultaneously, such as deflection, focusing, and spectral selection of light.

The illuminator 110 may be configured with a designed operating wavelength band that includes at least a portion of the IR spectrum, overlaps the IR spectrum, or is included within the IR spectrum. In some embodiments, the designed operating wavelength band of the illuminator 110 may not include the visible wavelength band. For example, the illuminator 110 may be configured to deflect (e.g., diffract) an IR light, and transmit a visible light without a deflection (e.g., diffraction) or with negligible deflection (e.g., diffraction). In some embodiments, the illuminator 110 may also be referred to as an illumination combiner, meaning that the illuminator 110 combines and directs both of the IR light for illumination purposes and a light from the real-world environment to an area including the eye 115. The illuminator 110 is optically transparent to the light from the real-world environment and does not deflect the light from the real-world environment.

In some embodiments, the illuminator 110 may include a polarization volume hologram ("PVH") element, such as a PVH element functioning as a reflective grating (also referred to as a reflective PVH grating), a PVH element functioning as a reflective off-axis diffractive lens (also referred to as a reflective PVH off-axis lens), etc. In some embodiments, the PVH element may include suitable sub-wavelength structures, a birefringent material (e.g., liquid crystals), a photo-refractive holographic material, or a combination thereof. The PVH element may be fabricated based on various methods, such as holographic interference, laser direct writing, ink-jet printing, and various other forms of lithography. Thus, a "hologram" described herein is not limited to creation by holographic interference, or "holography."

In some embodiments, the illuminator 110 may include a hologram optical element ("HOE"), such as an HOE functioning as a reflective grating (also referred to as a reflective HOE grating), an HOE functioning as a reflective off-axis diffractive lens (also referred to as a reflective HOE off-axis lens), etc. In some embodiments, the illuminator 110 may include a surface relief element, e.g., a surface relief grating ("SRG"), that may be configured with an optical power or no optical power. An SRG configured with an optical power may be configured to function as an off-axis diffractive lens.

In some embodiments, the illuminator 110 may include a liquid crystal polymer ("LCP") layer. In some embodiments, the LCP layer may include polymerized (or cross-linked) LCs, polymer-stabilized LCs, photo-reactive LC polymers, or any combination thereof. The LCs may include nematic LCs, twist-bend LCs, chiral nematic LCs, smectic LCs, or any combination thereof. The LCP layer may exhibit an enhanced performance when coated or laminated on an optical element of a high curvature. In some embodiments, when the illuminator 110 includes multiple LCP layers or the LCP layer included in the illuminator 110 is coupled to another LCP layer included in another optical element, the two neighboring LCP layers may be configured to be index-matched layers, such that an optical loss at an interface between neighboring LCP layers may be reduced.

In some embodiments, the illumination system 100 may include a plurality of light sources 105, and a plurality of illuminators 110 disposed adjacent (e.g., facing) the eye 115 and the light sources 105. The plurality of illuminators 110 may be arranged in an array, such as a one-dimensional ("1D") array or a two-dimensional ("2D") array. The plurality of light sources 105 may be configured to emit a plurality of lights 102 propagating in different directions toward the plurality of illuminators 110, respectively. The plurality of illuminators 110 may be configured to backwardly deflect (e.g., diffract) the plurality of lights 102 as a plurality of deflected (e.g., diffracted) lights 104 propagating toward the eye 115 from different directions, respectively. The plurality of diffract lights 104 may illuminate the eye 115 from different directions, and/or may illuminate different areas of the eye 115.

In some embodiments, as shown in FIG. 1A, the illumination system 100 may include a single light source 105, and a plurality of illuminators 110 disposed adjacent (e.g., facing) the eye 115 and the light source 105. The plurality of illuminators 110 may be arranged in an array, such as a 1D array or a 2D array. The illumination system 100 may also include a light splitting element (or light splitter) 125 disposed between the light source 105 and the illuminators 110. The light source 105 may be configured to emit a single light (not shown) propagating toward the light splitting element 125. The light splitting element 125 may be configured to separate (or split), via a suitable mechanism, the single light into a plurality of lights 102 propagating in different directions toward the plurality of illuminators 110. The plurality of illuminators 110 may be configured to backwardly deflect (e.g., diffract) the plurality of lights 102 in a plurality of directions as a plurality of deflected (e.g., diffracted) lights 104 propagating toward the eye 115, respectively. The plurality of diffracted lights 104 may illuminate the eye 115 from different directions.

In some embodiments, the light splitting element 125 may include one or more PVH elements, one or more HOE elements, and/or one or more SRGs, etc. In some embodiments, the light splitting element 125 may include one or more diffractive optical elements configured to forwardly diffract the single light as a plurality of diffracted lights 102 propagating in different directions toward the plurality of illuminators 110. For example, the light splitting element 125 may include one or more transmission gratings. The x-y-z coordinate system shown in FIG. 1A refers to a global coordinate system for the illumination system 100, whereas an x'-y'-z' coordinate system shown in FIG. 1A may refer to a local coordinate system for the light splitting element 125 included in the illumination system 100.

Figure 1B:
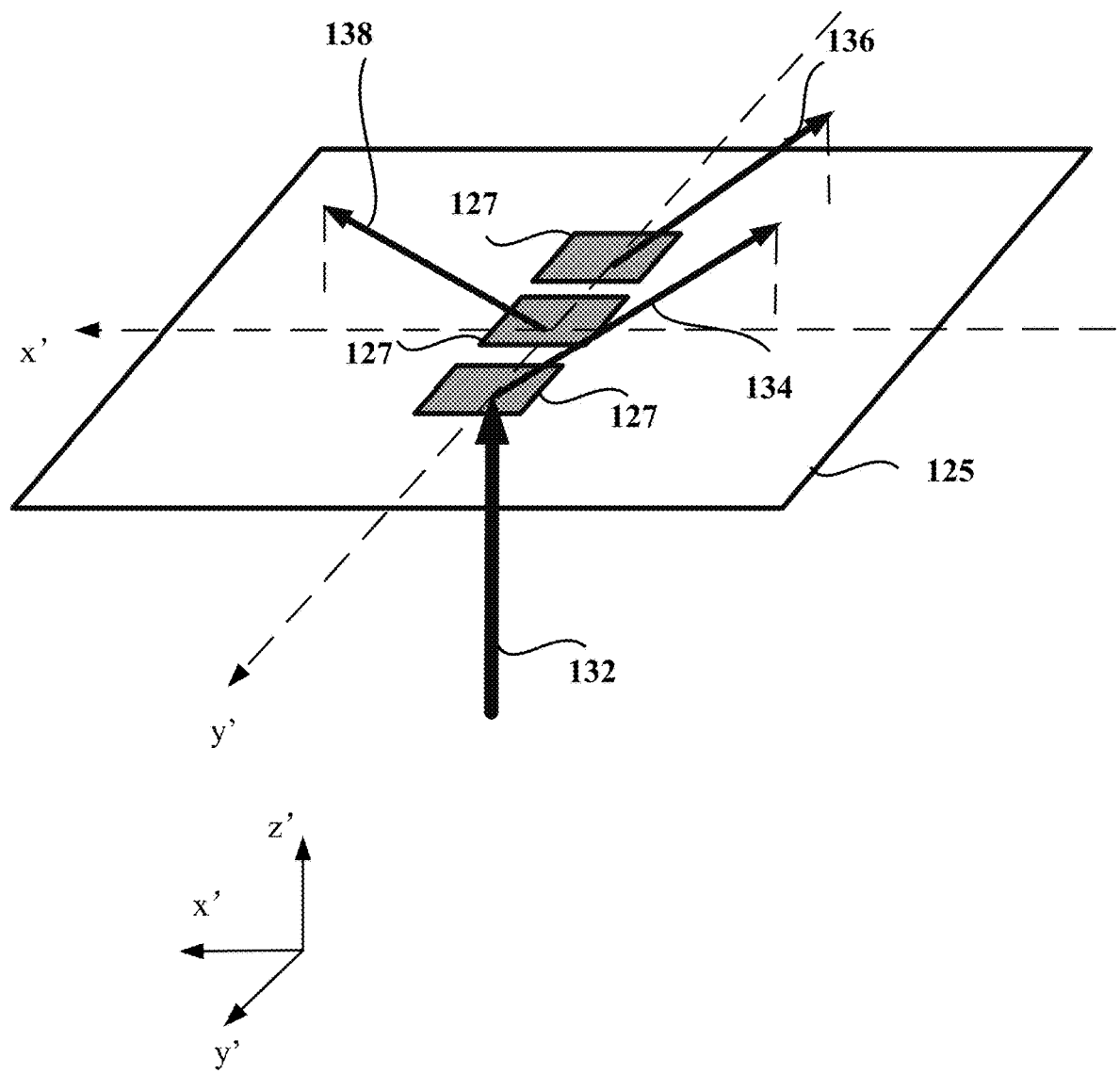
FIG. 1B illustrates a schematic diagram of a light splitting element that may be included in the illumination system shown in FIG. 1A, according to an embodiment of the present disclosure.

FIG. 1B illustrates a schematic diagram of the light splitting element 125 included in the illumination system 100 shown in FIG. 1A, according to an embodiment of the present disclosure. As shown in FIG. 1B, the light splitting element 125 may include a plurality of gratings 127 arranged in an array. In some embodiments, the gratings 127 may be 1D transmissive gratings. In some embodiments, the gratings 127 may be 1D reflective gratings. When the gratings 127 are reflective gratings, the configuration shown in FIG. 1A may be modified, such that the light source 105 may be disposed between the illuminators 110 and the light splitting element 125, facing the light splitting element 125.

For illustrative purposes, the gratings 127 are shown as transmissive gratings. As shown in FIG. 1B, the array of gratings 127 may be configured to forwardly diffract an IR light 132 output from the light source 105 as multiple diffracted lights 134, 136, and 138 propagating in different directions toward the plurality of illuminators 110 shown in FIG. 1A. For discussion purpose, FIG. 1B shows that the light splitting element 125 includes three gratings 127 arranged in a 1D array. The three gratings 127 forwardly diffract the IR light 132 as three diffracted lights propagating in three directions toward different illuminators 110. The light splitting element 125 may include any suitable number of gratings 127 arranged in a 1D or 2D array, which may forwardly diffract the IR light 132 as any suitable number of diffracted lights propagating in any suitable number of directions.

Figure 1C:
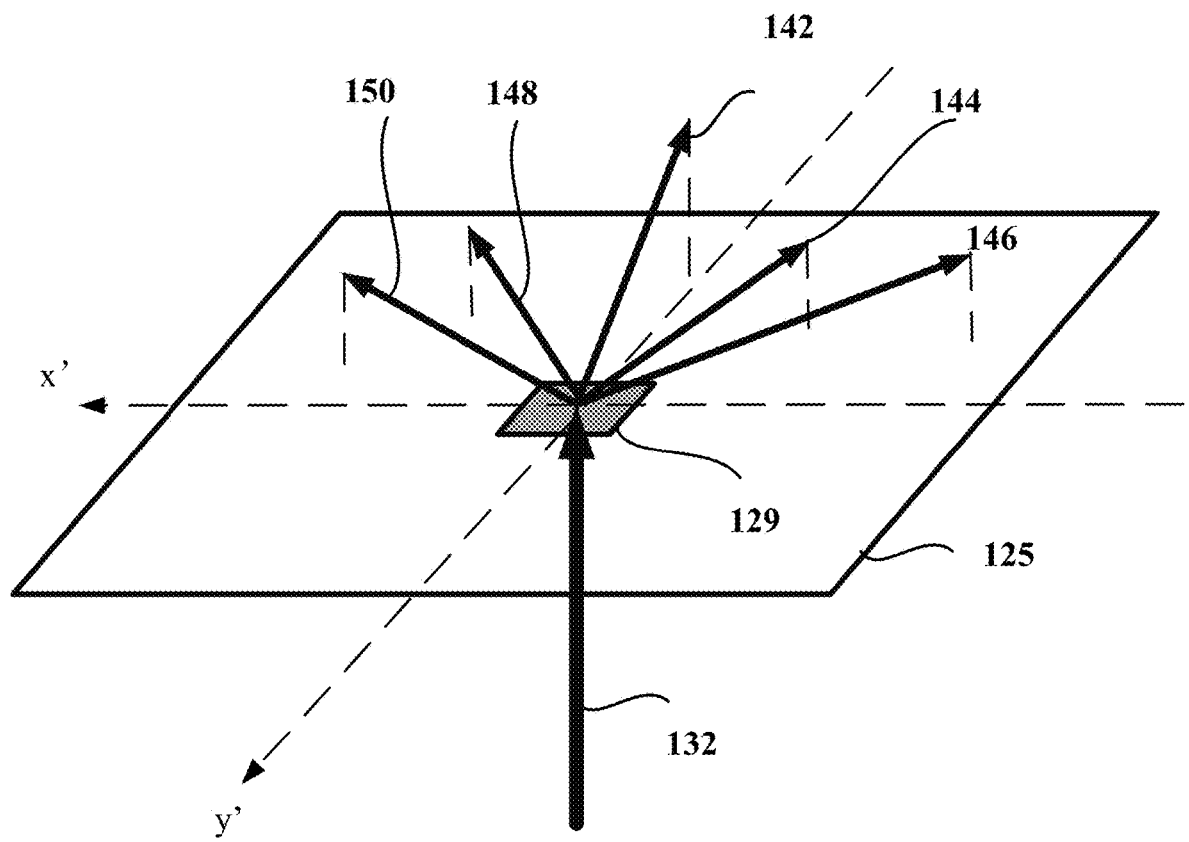
FIG. 1C illustrates a schematic diagram of a light splitting element that may be included in an illumination system shown in FIG. 1A, according to an embodiment of the present disclosure.

FIG. 1C illustrates a schematic diagram of the light splitting element 125 included in the illumination system 100 shown in FIG. 1A, according to an embodiment of the present disclosure. As shown in FIG. 1C, the light splitting element 125 may include a single grating 129. The grating 129 may be a 2D transmissive grating configured to forwardly diffract the IR light 132 output from the light source 105 shown in FIG. 1A to multiple diffraction orders, as diffracted lights 142, 144, 146, 148, and 150 propagating in different directions toward the plurality of illuminators 110 shown in FIG. 1A. For illustrative purpose, FIG. 1C shows that the grating 129 forwardly diffracts the IR light 132 as five diffracted lights. The grating 129 may forwardly diffract the IR light 132 as any suitable number of diffracted lights. In some embodiments, the light splitting element 125 may include a plurality of gratings 129 arranged in an array.

Referring back to FIG. 1A, in some embodiments, a size of the substrate 120 may be greater than a size of the eye 115. In some embodiments, the size of the substrate 120 may be at least greater than a size of the pupil 116 of the eye 115. For example, the illuminators 110 may be disposed at one or more surfaces of the substrate 120. In some embodiments, a plurality of the illuminators 110 may be disposed at different locations of the substrate 120 along the longitudinal direction (e.g., the y-axis direction) of the substrates. In some embodiments, the plurality of illuminators 110 may be positioned such that at least one illuminator 110 is located at one side of the pupil 116, and at least one illuminator 110 is located at the other side of the pupil 116 along the longitudinal direction of the substrate 120. In some embodiments, the substrates 120 may be optically transparent in one or more wavelength bands, e.g., the visible band, some or all of the IR band, and/or the ultraviolet ("UV") band, etc. In some embodiments, the substrate 120 may include a glass, a plastic, a sapphire, etc. The substrate 120 may be rigid, semi-rigid, flexible, or semi-flexible. The substrate 120 may include a flat surface or a curved surface, on which different layers or films (e.g., the illuminators 110) may be formed. In some embodiments, the substrate 120 may be a part of another optical element or device (e.g., another opto-electrical element or device). For example, the substrate 120 may be a solid optical lens, a part of a solid optical lens, or a light guide, etc.

Through configuring the positions and/or the optical properties of the illuminators 110, the direction of the deflected lights output from the illuminators 110, and/or the divergence of the deflected lights output from the illuminators 110, the illumination system 100 may be configured to provide a substantially uniform illumination to the eye 115, such as the central region of the eye 115. Accordingly, an eye tracking system including the disclosed illumination system may be configured to provide an enhanced tracking range and an increased tracking accuracy.

Figure 1D:
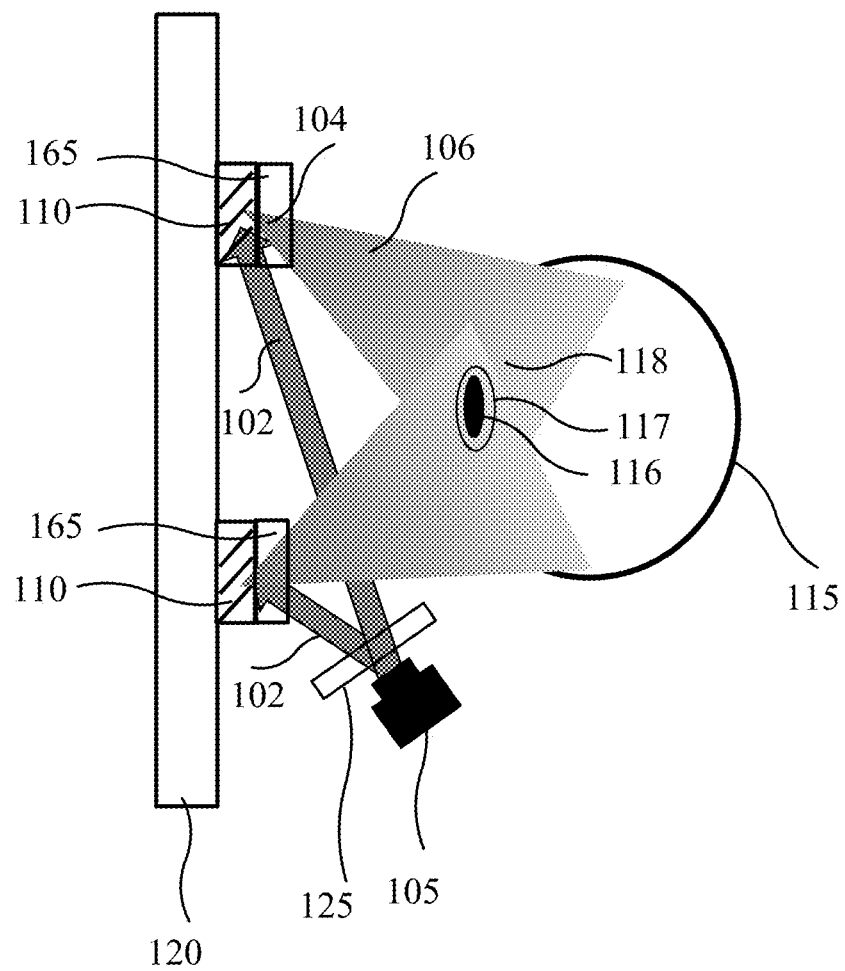
FIG. 1D illustrates a schematic diagram of an illumination system for object tracking, according to an embodiment of the present disclosure.

FIG. 1D schematically illustrates a y-z sectional view (e.g., a top view) of an illumination system 160 for eye tracking, according to an embodiment of the present disclosure. The illumination system 160 may include elements, structures, and/or functions that are the same as or similar to those included in the illumination system 100 shown in FIGS. 1A-1C. Detailed descriptions of the same or similar elements, structures, and/or functions may refer to the above descriptions rendered in connection with FIGS. 1A-1C. As shown in FIG. 1D, the illumination system 160 may include one or more light sources 105, and one or more illuminators (or illuminating elements) 110 disposed on the substrate 120. For illustrative purposes, FIG. 1D shows that the illumination system 160 includes one light source 105 and two illuminators 110. The light splitting element 125 is shown as being disposed between the light source 105 and the illuminators 110. In the embodiment shown in FIG. 1D, the light splitting element 125 may be a transmissive element.

In the embodiment shown in FIG. 1D, the illumination system 160 may also include one or more retardation films (or phase retarders) 165 disposed adjacent or at the one or more illuminators 110. For discussion purposes, FIG. 1D shows that the illumination system 160 includes two retardation films 165 disposed adjacent or at the two illuminators 110, respectively. In the embodiment shown in FIG. 1D, a retardation film 165 may be disposed at each illuminator 110. In some embodiments, the retardation film 165 may be disposed at a side (or surface) of the illuminator 110 facing the light source 105. In some embodiments, the retardation film 165 may be configured with a size that is substantially the same as or slightly larger than the size of the illuminator 110, and may be aligned with the illuminator 110.

The retardation film 165 may be fabricated based on any suitable materials, such as liquid crystals, polymers, or plastics, etc. The retardation film 165 may function as a polarization controlling or converting element. In the embodiment shown in FIG. 1D, the retardation film 165 may be configured to provide a predetermined phase retardation (or predetermined phase retardation profile) to the light 104 deflected by the illuminator 110 to re-configure, control, alter, affect, vary, change, modify, or maintain the polarization of the light 104 based on a predetermined polarization, such that the light 104 illuminating the eye 115 has the predetermined polarization. For example, the retardation film 165 may be configured to convert the light 104 deflected by the illuminator 110 into a light 106 having the predetermined polarization (or predetermined polarization profile). The light 106 may illuminate the eye 115.

In some embodiments, the retardation film 165 may be configured to provide a constant phase retardation to the light 104 deflected by the illuminator 110, such that the eye 115 may be illuminated by the light 106 having a spatially uniform polarization. In some embodiments, the retardation film 165 may be configured to provide a spatially varying phase retardation to the light 104 deflected by the illuminator 110, such that the eye 115 may be illuminated by the light 106 having a spatially varying polarization. For example, the retardation film 165 may be configured to provide a varying phase retardation along y-axis and/or the x-axis directions. In some embodiments, the retardation film 165 and the illuminator 110 may be individually elements coupled to one another. In some embodiments, the retardation film 165 and the illuminator 110 may be integrally formed, e.g., as parts of a single hologram. For example, the retardation film 165 and the illuminator 110 may be recorded into the single hologram.

In some embodiments, when the illumination system 160 is implemented into an eye tracking system to illuminate the eye 115, an optical sensor may generate eye tracking information based on a received signal light that is reflected by the eye 115 under the illumination by the light 106. In some embodiments, the eye tracking information generated by the optical sensor may include both intensity information and polarization information of the eye 115. An eye tracking image generated based on both the intensity information and the polarization information may have a significantly increased contrast between the pupil 116, the iris 117, and the sclera 118 of the eye 115. Thus, more information relating to the eye 115 may be extracted from the eye tracking image, thereby increasing the accuracy of eye tracking.

Figure 1E:
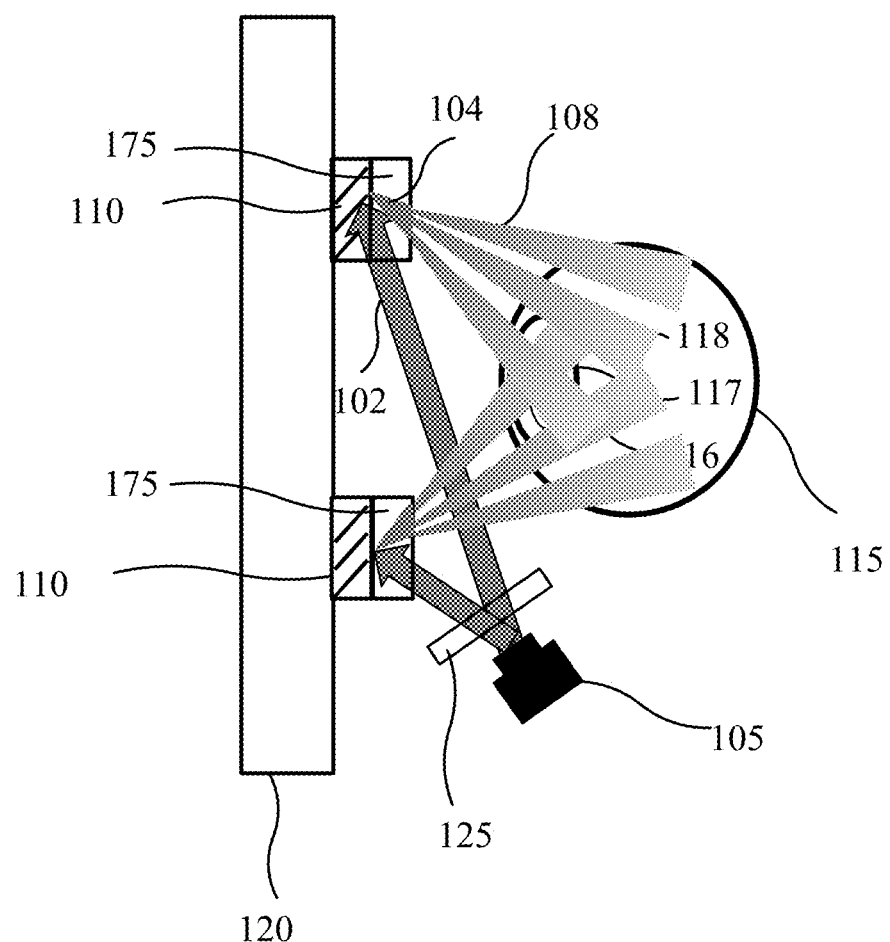
FIG. 1E illustrates a schematic diagram of an illumination system for object tracking, according to an embodiment of the present disclosure.

FIG. 1E schematically illustrates a y-z sectional view (e.g., a top view) of an illumination system 170 for eye tracking, according to an embodiment of the present disclosure. The illumination system 170 may include elements, structures, and/or functions that are the same as or similar to those included in the illumination system 100 shown in FIGS. 1A-1C, or the illumination system 160 shown in FIG. 1D. Detailed descriptions of the same or similar elements, structures, and/or functions may refer to the above descriptions rendered in connection with FIGS. 1A-1C or FIG. 1D. As shown in FIG. 1E, the illumination system 170 may include one or more light sources 105, and one or more illuminators (or illuminating elements) 110 coupled with the substrate 120. The one or more illuminators 110 may face the one or more light sources 105. For discussion purposes, FIG. 1E shows the illumination system 170 includes one light source 105, two illuminators 110, and the light splitting element 125 disposed between the light source 105 and the illuminators 110.

In the embodiment shown in FIG. 1E, the illumination system 170 may be configured to provide a structured light to illuminate the eye 115, or a structured illumination (or structured light pattern) to the eye 115. The structured illumination may increase the tracking accuracy of the eye 115. In some embodiments, the structured illumination may also enable the depth reconstruction of an tracked object, such as the face. The structured light may include at least one of an intensity-based structured light or a polarization-based structured light. The structured illumination (or structured light pattern) may include at least one of an intensity-based structured illumination or a polarization-based structured illumination. In some embodiments, the intensity-based structured illumination (or structured light pattern) may have a spatially varying intensity pattern, which may include a series of striped lines, grids, dots corresponding to different intensities, or other suitable patterns. For example, the spatially varying intensity pattern may include striped lines of various intensities interposed according to a predetermined pattern. In some embodiments, the polarization-based structured illumination (or structured light pattern) may have a spatially varying polarization pattern with a substantially uniform intensity. For example, the spatially varying polarization pattern may be a pattern of spatially varying orientations (or polarization directions) of linear polarizations. For example, a spatially varying polarization pattern may include spatially distributed different polarization directions according to a predetermined pattern.

When the structured light pattern is projected onto the eye 115 (and/or the face), the structured light pattern may be distorted by the eye 115 (and/or the face). In some embodiments, one or more optical sensors may capture one or more images of the eye 115 (and/or the face), with the distortions in the structured light pattern. Polarization information of the of eye 115 (and/or the face) may be extracted from the captured images. Polarization information of the of eye 115 (and/or the face) may be used to determine various properties of the eye 115 (and/or the face) that may not be extracted solely based on intensity information of the eye 115 (and/or the face).

In some embodiments, the light source 105 may be configured to provide a structured light. For example, the light 102 emitted from the light source 105 may be a structured light. The light 102 (e.g. structured light) incident onto the illuminator 110 may be backwardly deflected (e.g., diffracted) by the illuminator 110 toward the eye 115 to illuminate the eye 115. The eye 115 may reflect the light 102, and the reflected light may be received by the optical sensor. In some embodiments, the illuminator 110 itself may be configured to provide an engineered deflection (or a structured deflection), such that the illuminator 110 may deflect the light 102 as a structured light for illuminating the eye 115. For example, the illuminator 110 may include a diffractive optical element configured to provide an engineered diffraction (or a structured diffraction).

In some embodiments, the illumination system 170 may include one or more beam shapers (or beam shaping elements) 175 disposed adjacent to or at the one or more illuminators 110, and configured to generate at least one of an intensity-based structured illumination or a polarization-based structured illumination. For discussion purposes, FIG. 1E shows that the illumination system 170 includes two beam shaping elements 175 disposed adjacent or at the two illuminators 110, respectively. In some embodiments, the beam shaping element 175 may be disposed at a side (or surface) of the illuminator 110 facing the light source 105 and the eye 115. In some embodiments, the beam shaping element 175 may be configured with a size that is substantially the same as or slightly larger than the size of the illuminator 110, and may be aligned with the illuminator 110. For example, as shown in FIG. 1E, the illuminator 110 may backwardly deflect (e.g., diffract) the light 102 received from the light source 105 as the deflected light 104, and the beam shaping element 175 may be configured to convert the deflected light 104 into a structured light 108 for illuminating the eye 115. The structured light 108 may include at least one of an intensity-based structured light or a polarization-based structured light. In some embodiments, the beam shaping element 175 and the illuminator 110 may be individually elements coupled to one another. In some embodiments, the beam shaping element 175 and the illuminator 110 may be integrally formed, e.g., as parts of one hologram. For example, the beam shaping element 175 and the illuminator 110 may be recorded into a single hologram. In other words, the single hologram may function as both a beam shaping element and an illuminator.

The plurality of beam shaping elements 175 may be configured to provide the same beam shaping function or different beam shaping functions. In some embodiments, the respective beam shaping elements 175 may be configured to convert the respective deflected lights 104 into respective structured light patterns. Thus, a plurality of different structured light patterns may be time-sequentially or simultaneously provided onto the eye 115 (and/or the face). An optical sensor may capture one or more images of the eye 115 (and/or the face) illuminated by the respective structured light patterns. In some embodiments, the depth information of the eye 115 (and/or the face) may be extracted from the captured images.

Figure 2A:
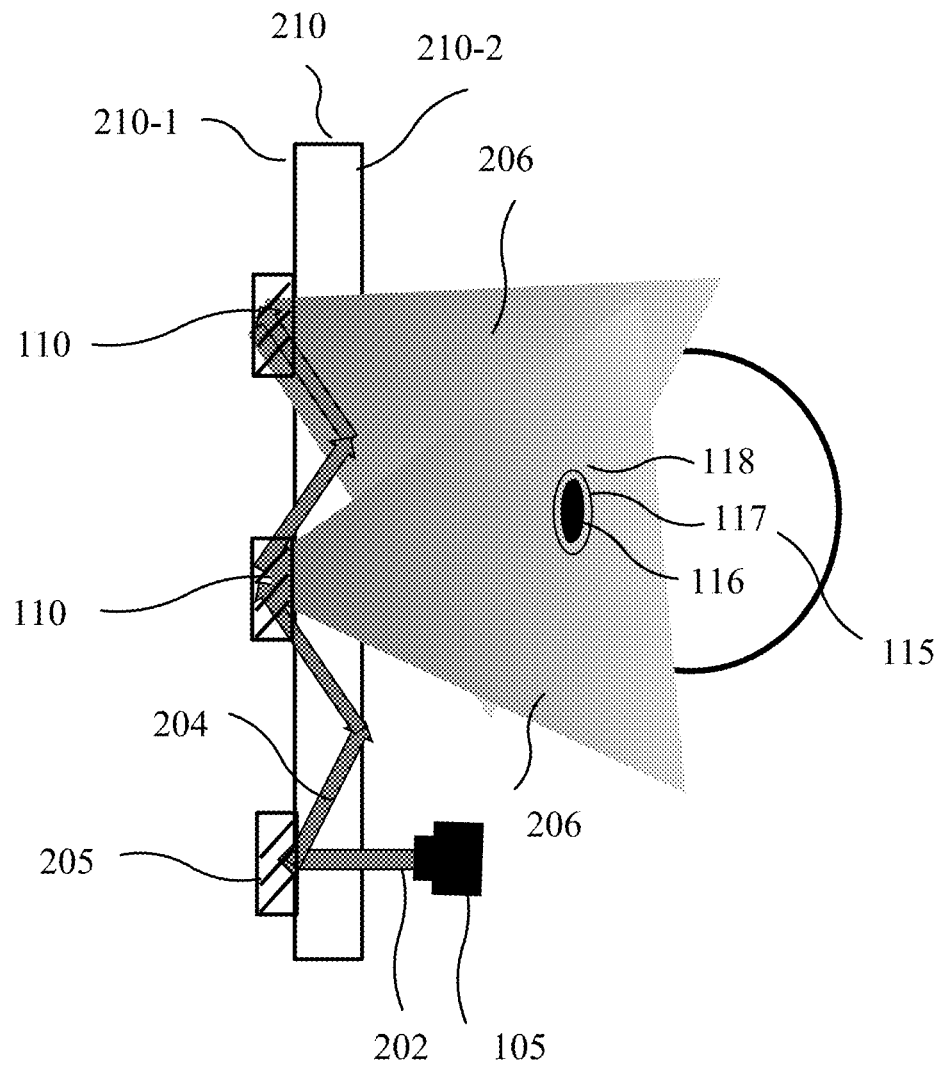
FIG. 2A illustrates a schematic diagram of an illumination system for object tracking, according to an embodiment of the present disclosure.
Figure 2A:
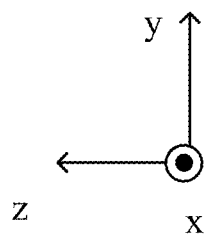

FIG. 2A schematically illustrates a y-z sectional view (e.g., a top view) of an illumination system 200 for eye tracking, according to an embodiment of the present disclosure. The illumination system 200 may include elements, structures, and/or functions that are the same as or similar to those included in the illumination system 100 shown in FIGS. 1A-1C, the illumination system 160 shown in FIG. 1D, or the illumination system 170 shown in FIG. 1E. Detailed descriptions of the same or similar elements, structures, and/or functions may refer to the above descriptions rendered in connection with FIGS. 1A-1C, FIG. 1D, or FIG. 1E.

As shown in FIG. 2A, the illumination system 200 may include one or more light sources 105. In the embodiment shown in FIG. 2A, the entire substrate 120 shown in FIG. 1A is a light guide 210. A size of the light guide 210 may be greater than a size of the eye 115, or at least greater than a size of the pupil 116. The illumination system 200 may also include one or more in-coupling elements 205 coupled to the light guide 210, and one or more illuminators (or illuminating elements) 110 coupled to the light guide 210. The one or more light sources 105 may be configured to emit one or more lights 202 propagating toward the one or more in-coupling elements 205. The one or more in-coupling elements 205 may couple the one or more lights 202 into the light guide 210 as one or more lights 204 propagating inside the light guide 210 toward the one or more illuminators 110 via total internal reflection ("TIR"). The one or more illuminators 110 may be configured to couple the one or more lights 204 out of the light guide 210 as one or more lights 206 for illuminating the eye 115. For discussion purposes, FIG. 2A shows the illumination system 200 includes one light source 105, one in-coupling element 205, and two illuminators 110. The in-coupling element 205 and the two illuminators 110 are shown as coupled to the light guide 210.

The light source 105 may generate the light 202 and output the light 202 to the in-coupling element 205 disposed at a first portion of the light guide 210. The light guide 210 may direct the light 202 to illuminate the eye 115. The in-coupling element 205 may couple the light 202 as the light 204 propagating inside, via TIR, the light guide 210 toward the illuminators 110 located at a second portion of the light guide 210. The first portion and the second portion may be located at different locations of the light guide 210. The illuminators 110 may be configured to couple (e.g., via backward or forward deflection) the light 204 out of the light guide 210 as a plurality of lights 206 for illuminating the eye 115. For discussion purposes, FIG. 2A shows that the illuminators 110 couple, via backward deflection, the light 204 out of the light guide 210 as the lights 206 for illuminating the eye 115. In some embodiments, the lights 206 may be configured to illuminate the eye 115 from different directions. In some embodiments, an eye tracking system including the illumination system 200 may provide multiple perspective views of the eye 115.

The light guide 210 may include one or more materials configured to facilitate the TIR of the light 204. The light guide 210 may include, for example, a plastic, a glass, and/or polymers. The light guide 210 may include a first surface or side 210-1 opposite to the eye 115 and an opposing second surface or side 210-2 facing the eye 115. Each of the in-coupling element 205 and the illuminator 110 may be disposed at the first surface 210-1 or the second surface 210-2 of the light guide 210. In some embodiments, as shown in FIG. 2A, the in-coupling element 205 and the illuminator 110 may be disposed at the second surface 210-2 of the light guide 210. In some embodiments, the in-coupling element 205 and the illuminator 110 may be disposed at the first surface 210-1 of the light guide 210. In some embodiments, the in-coupling element 205 and the illuminator 110 may be disposed at different surfaces of the light guide 210. In some embodiments, the in-coupling element 205 or the illuminator 110 may be integrally formed as a part of the light guide 210 at the corresponding surface. In some embodiments, the in-coupling element 205 or the illuminator 110 may be separately formed, and may be disposed at (e.g., affixed to) the corresponding surface.

In some embodiments, the in-coupling element 205 may include at least one of a prism, a PVH element, an HOE element, or an SRG. In some embodiments, the illuminator 110 may include a diffractive optical element, e.g. a grating, or an off-axis diffractive lens. In some embodiments, the illuminator 110 may include a transmissive diffractive optical element (e.g., e.g. a transmissive grating, or a transmissive off-axis diffractive lens) configured to couple, via forward diffraction, the light 204 out of the light guide 210 as the light 206 for illuminating the eye 115. In some embodiments, the illuminator 110 may include a reflective diffractive optical element (e.g., e.g. a reflective grating, or a reflective off-axis diffractive lens) configured to couple, via backward diffraction, the light 204 out of the light guide 210 as the light 206 for illuminating the eye 115. In some embodiments, the illuminator 110 may also diverge the light 204, while diffracting the light 204. For example, as shown in FIG. 2A, the light 206 diffracted by the illuminator 110 may be a diverging light, which may increase the illuminated area of the eye 115.

Figure 2B:
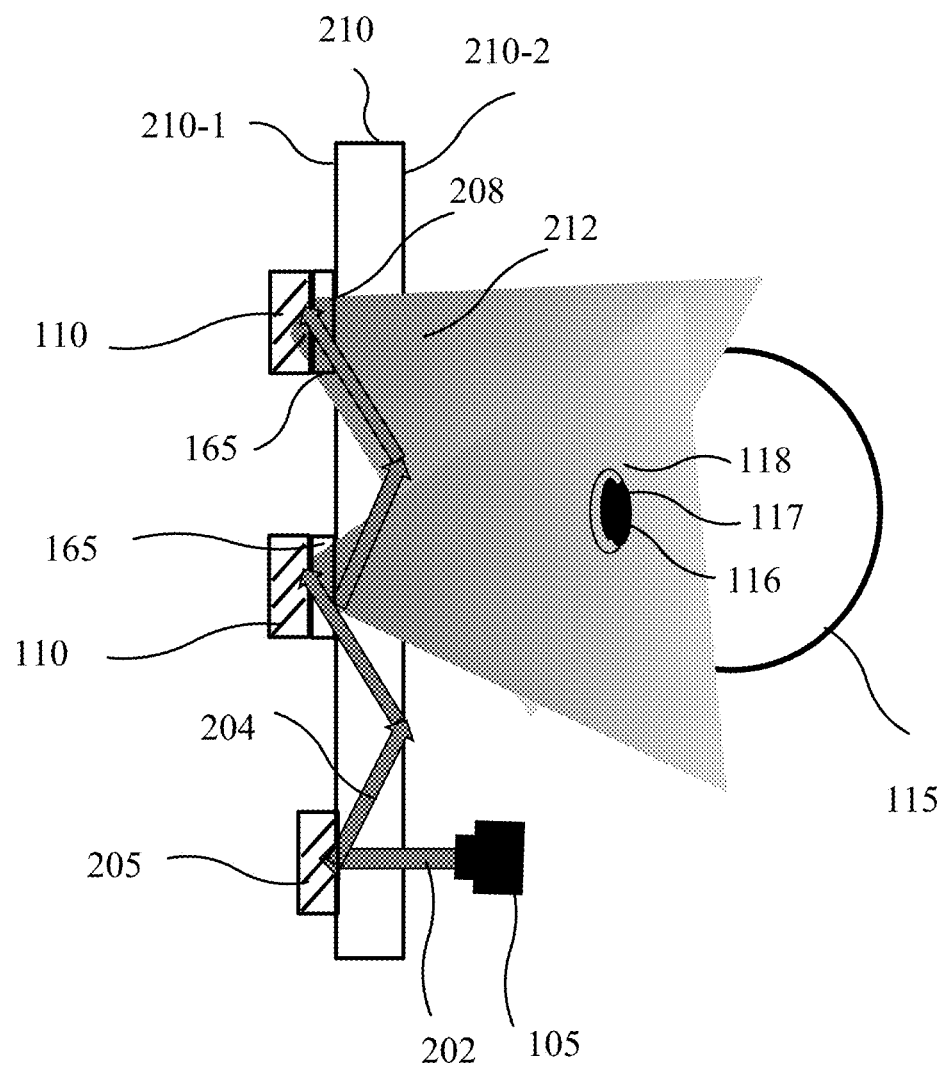
FIG. 2B illustrates a schematic diagram of an illumination system for object tracking, according to an embodiment of the present disclosure.

FIG. 2B schematically illustrates a y-z sectional view (e.g., a top view) of an illumination system 230 for eye tracking, according to an embodiment of the present disclosure. The illumination system 230 may include elements, structures, and/or functions that are the same as or similar to those included in the illumination system 100 shown in FIGS. 1A-1C, the illumination system 160 shown in FIG. 1D, the illumination system 170 shown in FIG. 1E, or the illumination system 200 shown in FIG. 2A. Detailed descriptions of the same or similar elements, structures, and/or functions may refer to the above descriptions rendered in connection with FIGS. 1A-1C, FIG. 1D, FIG. 1E, or FIG. 2A. As shown in FIG. 2B, the illumination system 230 may include one or more light sources 105, the light guide 210, one or more in-coupling elements 205 coupled to the light guide 210, and one or more illuminators (or illuminating elements) 110 coupled to the light guide 210.

In the embodiment shown in FIG. 2B, the illumination system 230 may also include one or more retardation films (or phase retarders) 165 coupled to the light guide 210. In some embodiments, the retardation film 165 may be separately formed, and may be disposed at (e.g., affixed to) a surface (e.g., the first surface 210-1 or second surface 210-2) of the light guide 210. In some embodiments, as shown in FIG. 2B, two retardation films 165 may be disposed at the first surface 210-1 of the light guide 210, adjacent or at the respective illuminators 110. In some embodiments, the retardation film 165 may be disposed at a side (or surface) of the illuminator 110 facing the light source 105 and the eye 115. In some embodiments, the retardation film 165 and the illuminator 110 may be disposed at the same surface of the light guide 210. In some embodiments, the retardation film 165 may be disposed between the light guide 210 and the illuminator 110. In some embodiments, the illuminator 110 may be disposed between the light guide 210 and the retardation film 165. In some embodiments, the retardation film 165 and the illuminator 110 may be disposed at different surfaces of the light guide 210, and the light guide 210 may be disposed between the retardation film 165 and the illuminator 110.

In some embodiments, the retardation film 165 may be integrally formed as a part of the light guide 210 at the corresponding surface. In some embodiments, the retardation film 165 and the illuminator 110 may be individually elements coupled to one another. In some embodiments, the retardation film 165 and the illuminator 110 may be integrally formed, e.g., as parts of a single hologram. For example, the retardation film 165 and the illuminator 110 may be recorded into a single hologram. In other words, the single hologram may function as both a retardation film and an illuminator.

In the embodiment shown in FIG. 2B, the illuminator 110 may decouple the light 204 propagating inside the light guide via TIR as a light 208. The retardation films 165 may be configured to provide a predetermined phase retardation (or predetermined phase retardation profile) to the light 208 decoupled by the illuminator 110. The retardation films 165 may re-configure, control, alter, affect, vary, change, modify, or maintain the polarization of the light 208 for illuminating the eye 115. For example, the retardation films 165 may be configured to convert the light 208 into a light 212 having a predetermined polarization (or predetermined polarization profile). In some embodiments, the retardation films 165 may be configured to provide a constant phase retardation to the light 208, such that the eye 115 may be illuminated by the light 212 having a spatially uniform polarization. In some embodiments, the retardation films 165 may be configured to provide a varying phase retardation to the light 208, such that the eye 115 may be illuminated by the light 212 having a spatially varying polarization.

Figure 2C:
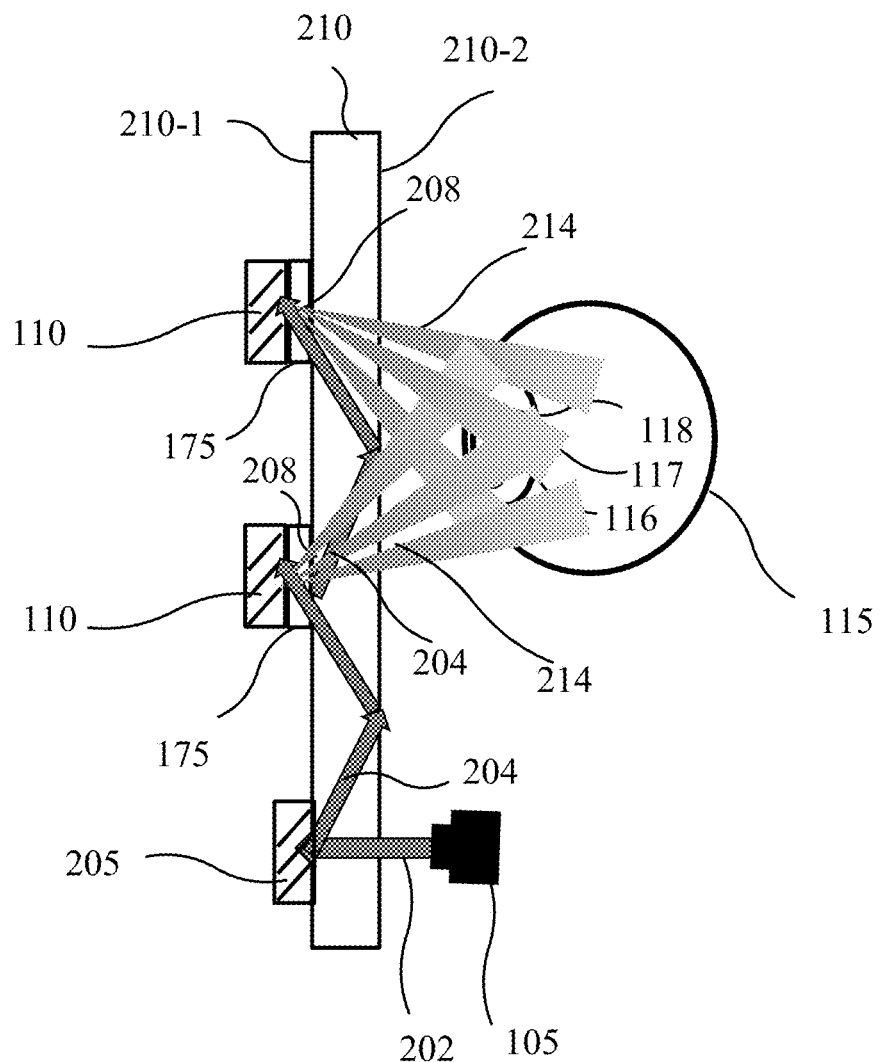
FIG. 2C illustrates a schematic diagram of an illumination system for object tracking, according to an embodiment of the present disclosure.

FIG. 2C schematically illustrates a y-z sectional view (e.g., a top view) of an illumination system 260 for eye tracking, according to an embodiment of the present disclosure. The illumination system 260 may include elements, structures, and/or functions that are the same as or similar to those included in the illumination system 100 shown in FIGS. 1A-1C, the illumination system 160 shown in FIG. 1D, the illumination system 170 shown in FIG. 1E, the illumination system 200 shown in FIG. 2A, or the illumination system 230 shown in FIG. 2B. Detailed descriptions of the same or similar elements, structures, and/or functions may refer to the above descriptions rendered in connection with FIGS. 1A-1C, FIG. 1D, FIG. 1E, FIG. 2A, or FIG. 2B. As shown in FIG. 2C, the illumination system 260 may include one or more light sources 105, the light guide 210, one or more in-coupling elements 205 coupled to the light guide 210, and one or more illuminators (or illuminating elements) 110 coupled to the light guide 210.

In the embodiment shown in FIG. 2C, the illumination system 260 may be configured to provide a structured light to illuminate the eye 115, or a structured illumination (or structured light pattern) to the eye 115. The structured light may include at least one of an intensity-based structured light or a polarization-based structured light. The structured illumination (or structured light pattern) may include at least one of an intensity-based structured illumination or a polarization-based structured illumination. In some embodiments, the light source 105 may be configured to provide a structured light. For example, the light 202 emitted from the light source 105 may be a structured light. The in-coupling element 205 may couple the light 202 into the light guide 210 as the light 204 (which may be a structured light), and the illuminators 110 may couple the light 204 output of the light guide 210 as one or more structured lights for illuminating the eye 115. In some embodiments, the illuminator 110 itself may be configured to provide an engineered deflection (or a structured deflection), such that the illuminator 110 may couple the light 204 (which may be an unstructured light) out of the light guide 210 as a structured light for illuminating the eye 115. For example, the illuminator 110 may include a diffractive optical element configured to provide an engineered diffraction (or a structured diffraction), such that the illuminator 110 may couple, via diffraction, the light 204 (which may be an unstructured light) out of the light guide 210 as a structured light for illuminating the eye 115.

In some embodiments, as shown in FIG. 2C, the illumination system 260 may include one or more beam shapers (or beam shaping elements) 175 coupled to the light guide 210. In some embodiments, the beam shaping elements 175 may be separately formed, and may be disposed at (e.g., affixed to) a surface (e.g., the first surface 210-1 or the second surface 210-2) of the light guide 210. In some embodiments, as shown in FIG. 2C, two beam shaping elements 175 may be disposed at the first surface 210-2 of the light guide 210, adjacent or at the respective illuminators 110. In some embodiments, the beam shaping elements 175 may be disposed at a side (or surface) of the illuminator 110 facing the light source 105 and the eye 115. In some embodiments, the beam shaping elements 175 and the illuminator 110 may be disposed at the same surface of the light guide 210. In some embodiments, the beam shaping elements 175 may be disposed between the light guide 210 and the illuminator 110. In some embodiments, the illuminator 110 may be disposed between the light guide 210 and the beam shaping elements 175. In some embodiments, the beam shaping elements 175 and the illuminator 110 may be disposed at different surfaces of the light guide 210, and the light guide 210 may be disposed between the beam shaping elements 175 and the illuminator 110.

In some embodiments, the beam shaping elements 175 may be integrally formed as a part of the light guide 210 at the corresponding surface. In some embodiments, the beam shaping elements 175 and the illuminator 110 may be individually elements coupled to one another. In some embodiments, the beam shaping element 175 and the illuminator 110 may be integrally formed, e.g., as parts of a single hologram. For example, the beam shaping element 175 and the illuminator 110 may be recorded into a single hologram. In other words, the single hologram may function as both a beam shaping element and an illuminator.

In the embodiment shown in FIG. 2C, the illuminator 110 may decouple the light 204 propagating inside the light guide via TIR as the light 208, and the beam shaping elements 175 may be configured to convert the decoupled light 208 into a structured light 214 for illuminating the eye 115 (and/or the face). The structured light 214 may include at least one of an intensity-based structured light or a polarization-based structured light. In some embodiments, the beam shaping elements 175 may be configured to provide the same beam shaping function or different beam shaping functions. In some embodiments, the respective beam shaping elements 175 may be configured to convert the respective decoupled lights 208 into respective structured light patterns. Thus, a plurality of different structured light patterns may be time-sequentially or simultaneously provided onto the eye 115 (and/or the face). An optical sensor may capture one or more images of the eye 115 (and/or the face) illuminated by the respective structured light patterns. In some embodiments, due to the structured light patterns, the depth information of the eye 115 (and/or the face) may be extracted from the captured images.

Figure 2D:
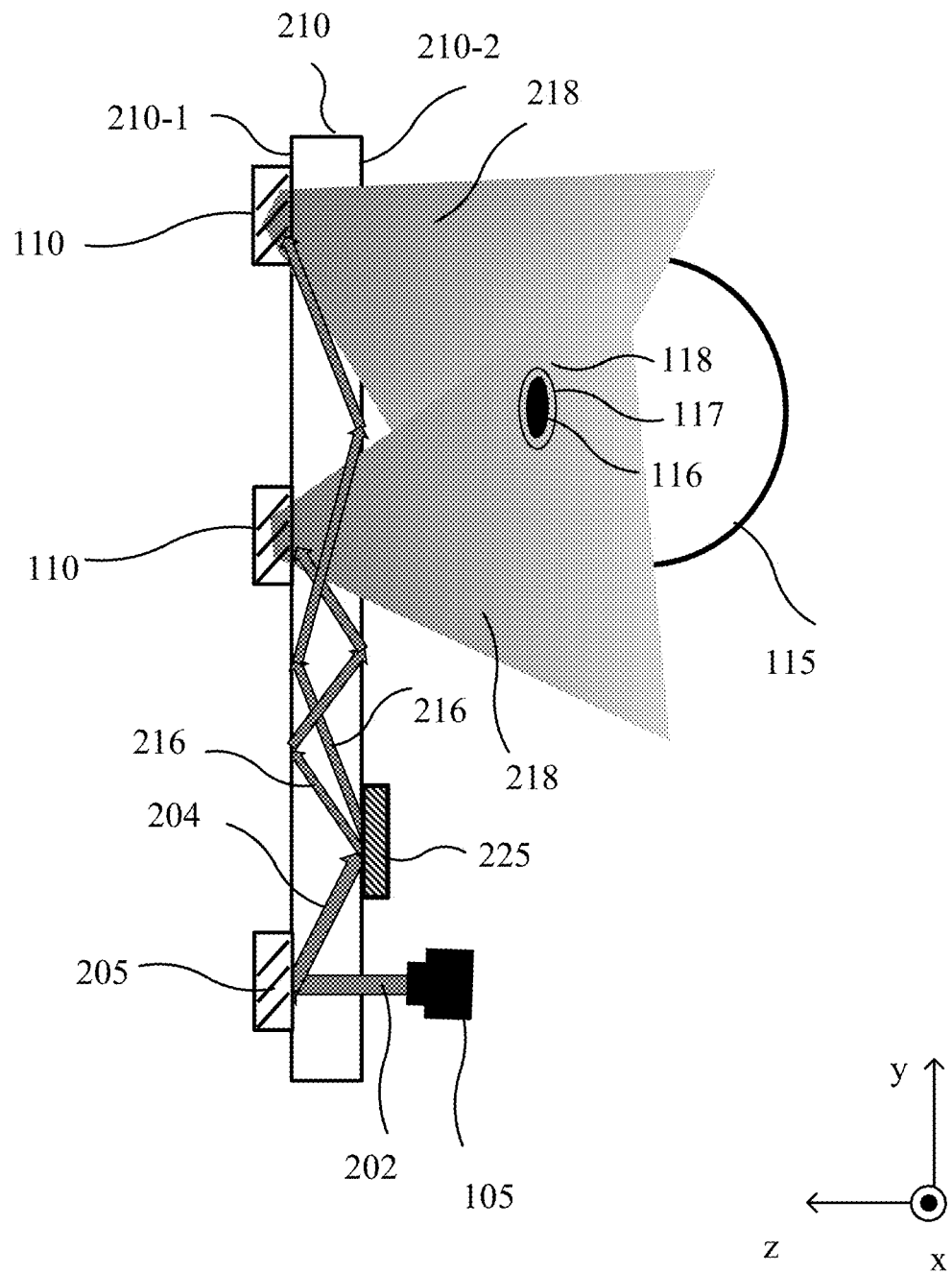
FIG. 2D illustrates a schematic diagram of an illumination system for object tracking, according to an embodiment of the present disclosure.

FIG. 2D schematically illustrates a y-z sectional view (e.g., a top view) of an illumination system 270 for eye tracking, according to an embodiment of the present disclosure. The illumination system 270 may include elements, structures, and/or functions that are the same as or similar to those included in the illumination system 100 shown in FIGS. 1A-1C, the illumination system 160 shown in FIG. 1D, the illumination system 170 shown in FIG. 1E, the illumination system 200 shown in FIG. 2A, the illumination system 230 shown in FIG. 2B, or the illumination system 260 shown in FIG. 2C. Detailed descriptions of the same or similar elements, structures, and/or functions may refer to the above descriptions rendered in connection with FIGS. 1A-1C, FIG. 1D, FIG. 1E, FIG. 2A, FIG. 2B, or FIG. 2C. As shown in FIG. 2D, the illumination system 270 may include one or more light sources 105, the light guide 210, one or more in-coupling elements 205 coupled to the light guide 210, and one or more illuminators (or illuminating elements) 110 coupled to the light guide 210.

In some embodiments, as shown in FIG. 2D, the illumination system 270 may include a light splitting element (or light splitter) 225 coupled to the light guide 210. The light splitting element 225 may be configured to separate (or split), via a suitable mechanism, a light into a plurality of portions (or sub-lights) propagating in different directions. In some embodiments, the light splitting element 225 may include one or more PVH elements, one or more HOE elements, and/or one or more SRGs configured to split a light into a plurality of portions (or sub-lights) via backward or forward diffraction.

In some embodiments, the light splitting element 225 may be separately formed, and may be disposed at (e.g., affixed to) a surface (e.g., the first surface 210-1 or the second surface 210-2) of the light guide 210. In some embodiments, the light splitting element 225 may be separately formed, and may be disposed at (e.g., affixed to) a surface (e.g., the first surface 210-1 or the second surface 210-2) of the light guide 210. In some embodiments, the light splitting element 225 may be disposed at a side (or surface) of the illuminator 110 facing the light source 105 and the eye 115. In some embodiments, the light splitting element 225 and the illuminator 110 may be disposed at different surfaces of the light guide 210, and the light guide 210 may be disposed between the light splitting element 225 and the illuminator 110. For example, as shown in FIG. 2D, the light splitting element 225 may be disposed at the second surface 210-2 of the light guide 210, and the illuminators 110 may be disposed at the first surface 210-1 of the light guide 210. In some embodiments, the light splitting element 225 and the illuminator 110 may be disposed at the same surface of the light guide 210. In some embodiments, the light splitting element 225 may be disposed between the light guide 210 and the illuminator 110. In some embodiments, the light splitting element 225 may be integrally formed as a part of the light guide 210 at the corresponding surface. In some embodiments, the light splitting element 225 and the illuminator 110 may be individual elements coupled to one another. In some embodiments, the light splitting element 225 and the illuminator 110 may be integrally formed, e.g., as parts of a single hologram. For example, the light splitting element 225 and the illuminator 110 may be recorded into the single hologram.

For example, as shown in FIG. 2D, the in-coupling element 205 may couple the light 202 emitted from the light source 105 as the light 204 propagating inside the light guide 210 via TIR. The light splitting element 225 may be configured to split the light 204 into a plurality of potions (referred to as a plurality of lights 216) prorogating toward the illuminators 110. The illuminators 110 may be configured to couple the plurality of lights 216 out of the light guide 210 as a plurality of lights 218 for illuminating the eye 115 from different directions. In some embodiments, as shown in FIG. 2D, the light splitting element 225 and the illuminators 110 may be disposed at different surfaces of the light guide 210, and the light splitting element 225 may include one or more diffractive optical elements configured to backwardly diffract the light 204 into the plurality of lights 216 prorogating toward the respective illuminators 110.

Figure 2E:
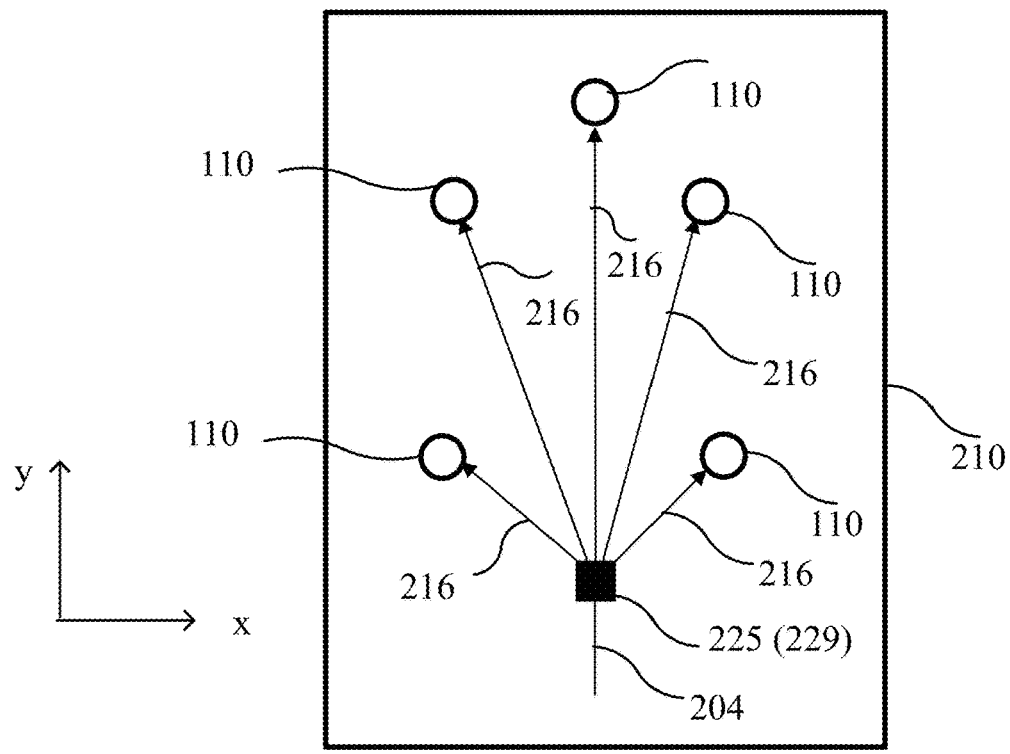
FIG. 2E illustrates a schematic diagram of a light splitting element that may be included in the illumination system shown in FIG. 2D, according to an embodiment of the present disclosure.

FIG. 2E illustrates an x-y sectional view of the light guide 210, the illuminators 110, and the light splitting element 225 that may be included in the illumination system 270 shown in FIG. 2D, according to an embodiment of the present disclosure. For discussion purposes, in the embodiment shown in FIGS. 2D and 2E, the illuminators 110 may be disposed at the first surface 210-1 of the light guide 210, and the light splitting element 225 may be disposed at the second surface 210-2 of the light guide 210. In the embodiment shown FIGS. 2D and 2E, the light splitting element 225 may include a 2D reflective grating 229. For the light 204 incident onto the light splitting element 225, the 2D reflective grating 229 may be configured to backwardly diffract the light 204 to multiple diffraction orders, such as five diffracted lights 216 propagating toward the respective illuminators 110 disposed at the first surface 210-1 of the light guide 210. The respective illuminators 110 may couple the respective lights 216 out of the light guide 210 as the respective lights 218 for illuminating the eye 115. Although not shown, in some embodiments, the light splitting element 225 may include a plurality of 2D reflective gratings 229 arranged in an array.

Figure 2F:
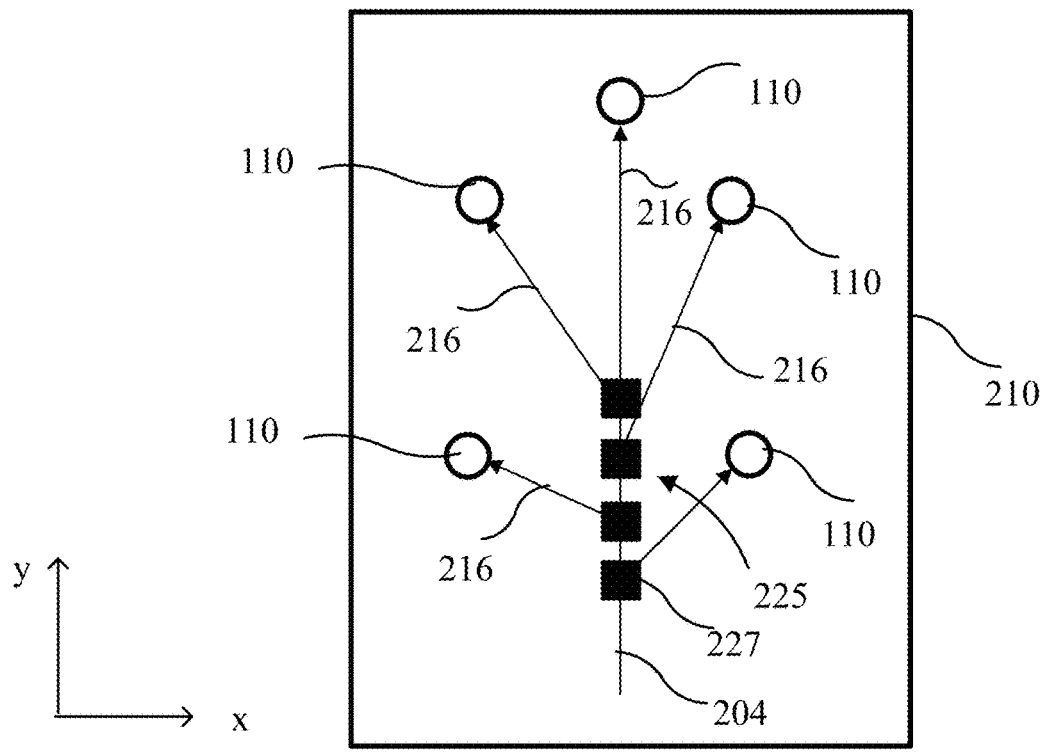
FIG. 2F illustrates a schematic diagram of a light splitting element that may be included in an illumination system shown in FIG. 2D, according to an embodiment of the present disclosure.

FIG. 2F illustrates an x-y sectional view of the light guide 210, the illuminators 110, and the light splitting element 225 that may be included in the illumination system 270 shown in FIG. 2D, according to an embodiment of the present disclosure. For discussion purposes, in the embodiment shown in FIG. 2D and FIG. 2F, the illuminators 110 may be disposed at the first surface 210-1 of the light guide 210, and the light splitting element 225 may be disposed at the second surface 210-2 of the light guide 210. In the embodiment shown in FIG. 2F, the light splitting element 225 may include a plurality of gratings 227 arranged in an array. The gratings 227 may be 1D reflective gratings. When the light 204 propagating inside the light guide 210 via TIR is incident onto the gratings 227, the gratings 227 may be configured to backwardly diffract the light 204 in different directions as different diffracted lights, such as five diffracted lights 216 propagating toward the respective illuminators 110 disposed at the first surface 210-1 of the light guide 210. The respective illuminators 110 may couple the respective lights 216 out of the light guide 210 as the respective lights 218 for illuminating the eye 115. For discussion purpose, FIG. 2F shows that the light splitting element 225 includes four gratings 227 arranged in a 1D array, which backwardly diffracts the light 204 as five diffracted lights. The light splitting element 225 may include any suitable number of gratings 227 arranged in a 1D or 2D array, which backwardly diffracts the light 204 to any suitable number of orders as any suitable number of diffracted lights.

In some embodiments, although not shown, the light splitting element 225 and the illuminators 110 may be disposed at the same surface of the light guide 210. The light splitting element 225 may include one or more transmissive diffractive optical elements configured to forwardly diffract the light 204 as the plurality of lights 216 prorogating toward the respective illuminators 110. For example, in some embodiments, the light splitting element 225 may include a 2D transmissive grating. For the light 204 incident onto the light splitting element 225, the 2D transmissive grating may be configured to forwardly diffract the light 204 to multiple diffraction orders as different lights 216 propagating toward the respective illuminators 110. The respective illuminators 110 may couple the respective diffracted lights 216 out of the light guide 210 as the respective lights 218 for illuminating the eye 115. In some embodiments, the light splitting element 225 may include a plurality of 2D transmissive gratings arranged in an array. In some embodiments, the light splitting element 225 may include a plurality of 1D transmissive gratings arranged in an array. When the light 204 propagating inside the light guide 210 via TIR is incident onto the gratings 227, the 1D transmissive gratings may be configured to forwardly diffract the light 204 to multiple diffraction orders as different lights 216 propagating in different directions toward the respective illuminators 110 disposed at the first surface 210-1 of the light guide 210. The respective illuminators 110 may couple the respective diffracted lights 216 out of the light guide 210 as the respective lights 218 for illuminating the eye 115.

The elements in the illumination systems and the features of the illumination systems as described in various embodiments may be combined in any suitable manner. For example, in some embodiments, the illuminator 110 shown in FIG. 1A may be coupled to both of the retardation film 165 shown in FIG. 1D and the beam shaping element 175 shown in FIG. 1E. In some embodiments, the illuminator 110 shown in FIG. 2A may be coupled to both of the retardation film 165 shown in FIG. 2B and the beam shaping element 175 shown in FIG. 2C. In some embodiments, the illuminator 110 shown in FIG. 2D may be coupled to both of the retardation film 165 shown in FIG. 2B and the beam shaping element 175 shown in FIG. 2C.

Figure 3A:
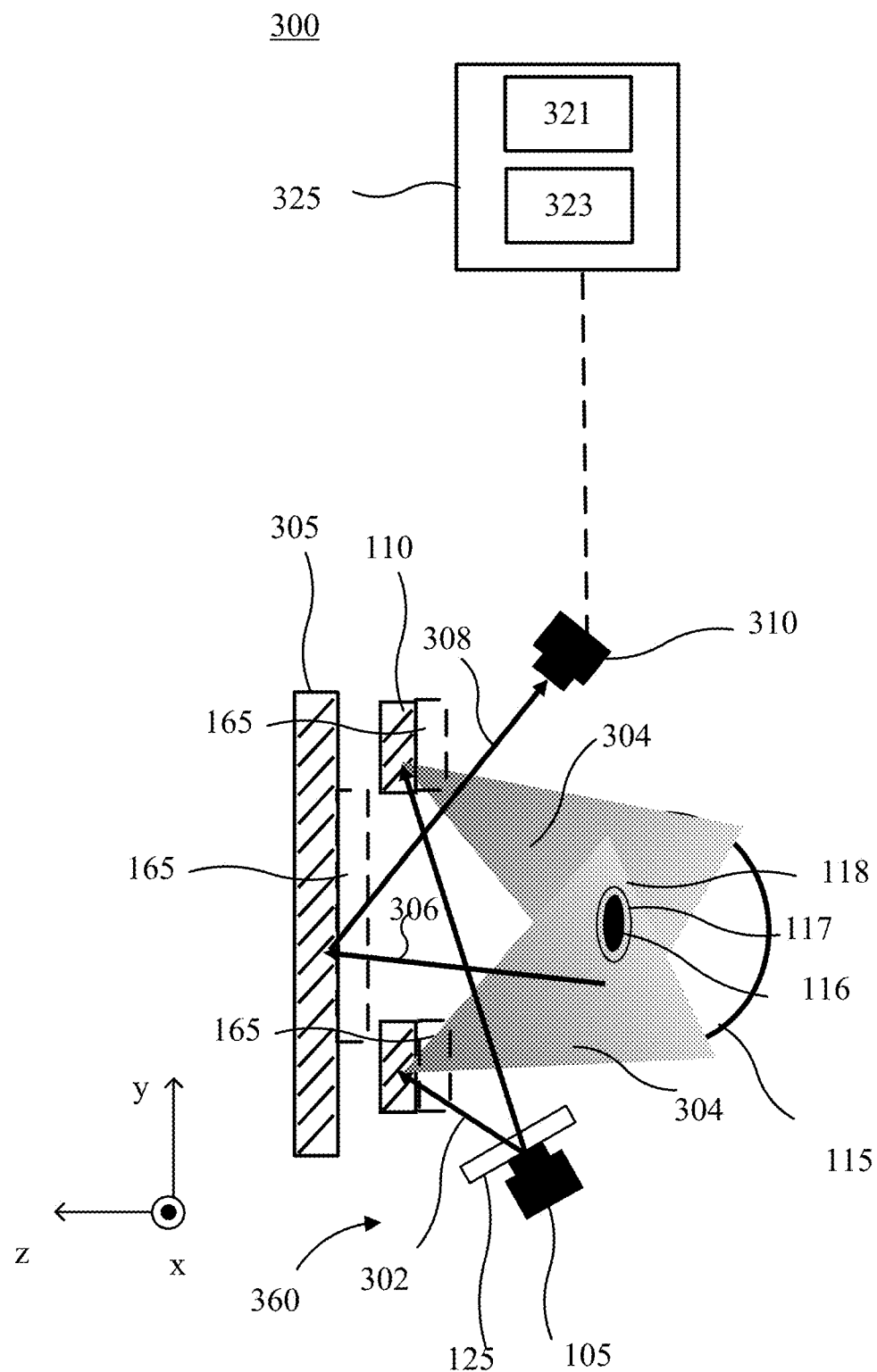
FIG. 3A illustrates a schematic diagram of an object tracking system, according to an embodiment of the present disclosure.

FIG. 3A schematically illustrates a y-z sectional view (e.g., a top view) of an object tracking system or assembly 300, according to an embodiment of the present disclosure. For discussion purposes, the object tracking system 300 may be an eye tracking (and face tracking) system 300. The object tracking system 300 may include an illumination system or assembly 360 that may be an embodiment of the illumination systems disclosed herein, such as the illumination system 100 shown in FIGS. 1A-1C, the illumination system 160 shown in FIG. 1D, the illumination system 170 shown in FIG. 1E, the illumination system 200 shown in FIG. 2A, the illumination system 230 shown in FIG. 2B, the illumination system 260 shown in FIG. 2C, or the illumination system 270 shown in FIGS. 2D-2F. As shown in FIG. 3A, for illustrative purposes, the illumination system 360 is shown to be similar to the illumination system 160 shown in FIG. 1D. It is understood that the illumination system 360 may be similar to any of the above disclosed illumination systems. Detailed descriptions of the illumination system 360 may refer to the above descriptions rendered in connection with FIGS. 1A-1C, FIG. 1D, FIG. 1E, FIG. 2A, FIG. 2B, FIG. 2C, or FIGS. 2D-2F. For discussion purposes, the object tracking system 300 may be an object tracking system for one or both eyes 115 (and the face) of a user of the object tracking system 300.

As shown in FIG. 3A, the illumination system 360 may include the light source 105, a plurality of (e.g., two) illuminators (or illuminating elements) 110, and the light splitting element 125 disposed between the light source 105 and the illuminators 110. The object tracking system 300 may also include a light deflecting element 305 arranged facing the eye 115, and one or more optical sensors (or imaging devices) 310. The light deflecting element 305 may be configured to deflect a signal light reflected by the object (e.g., the eye 115) toward the optical sensors 310. A signal light refers to a light reflected by the object being tracked, which may be deflected to the optical sensors 310 and be received by the optical sensors 310. Thus, the light deflecting element 305 may also be referred to as a signal light deflecting element. For illustrative purposes, one optical sensor 310 is shown in FIG. 3A. In some embodiments, the components for tracking the eye 115 may be replicated for tracking the other eye of the user, which are omitted in FIG. 3A. Although the illuminators 110 are shown in FIG. 3A as being separated from the signal light deflecting element 305, in some embodiments, the illuminators 110 may be directly coupled with the signal light deflecting element 305.

The light source 105 may emit a light (e.g., an IR light, not shown) propagating toward the light splitting element 125. The light splitting element 125 may spilt the light received from the light source 105 into a plurality of lights 302 propagating toward the respective illuminators 110. The illuminators 110 may backwardly deflect the lights 302 as lights 304 for illuminating the eye 115 from different perspectives. The eye 115 may reflect the lights 304 as one or more reflected signal lights 306 propagating toward the signal light deflecting element 305. FIG. 3A shows one reflected signal light 306 for illustrative purposes. The signal light deflecting element 305 may deflect the light 306 reflected by the eye 115 to the optical sensor 310. For example, the signal light deflecting element 305 may deflect the signal light 306 reflected by the eye 115 as a signal light 308 propagating toward the optical sensor 310.

The signal light deflecting element 305 may be configured to have a designed operating wavelength band that includes at least a portion of the IR spectrum. In some embodiments, the designed operating wavelength band of the signal light deflecting element 305 may not include visible wavelength band. For example, the signal light deflecting element 305 may deflect an IR light, and substantially transmit a visible light without a deflection or with negligible deflection. In some embodiments, the signal light deflecting element 305 may also be referred to as an eye tracking combiner. In some embodiments, the signal light deflecting element 305 may include a PVH element, an HOE element, an SRG element, or any combination thereof.

In some embodiments, as both of the signal light deflecting element 305 and the illuminators 110 have a designed operating wavelength band that includes at least a portion of the IR spectrum, the signal light deflecting element 305 and the illuminators 110 may be configured to have different spatial positions, different angular bandwidths (or spectra), and/or operate for IR lights with different polarizations. Thus, a cross-interference or crosstalk between the operations of the signal light deflecting element 305 and the illuminators 110 may be reduced or minimized. For example, in some embodiments, a diffractive optical element included in the signal light deflecting element 305 and a diffractive optical element included in the illuminator 110 may be configured to have substantially non-overlapping angular spectra. In some embodiments, a diffractive optical element included in the signal light deflecting element 305 and a diffractive optical element included in the illuminator 110 may be configured to diffract IR lights of orthogonal polarizations.

The optical sensor 310 may be arranged off-axis with respect to the signal light deflecting element 305, and off-axis with respect to the eye (e.g., at a side of the eye, face, or user's head) 115 to receive the signal light 308 deflected from the signal light deflecting element 305. The optical sensor 310 may be configured to generate images based on lights having a wavelength within a predetermined wavelength range or spectrum that includes at least a portion of the IR spectrum. In some embodiments, the optical sensor 310 may be configured to generate images based on IR lights but not visible lights. In some embodiments, the optical sensor 310 may include a camera, or a photodiode, etc., such as a CCD camera, a CMOS sensor, an NMOS sensor, a polarized image sensor (e.g., a pixelated polarized camera), or any other optical sensor. The optical sensor 310 may generate a tracking signal based on the received signal light 308. Based on the tracking signal, the optical sensor 310 may generate an image of the eye 115, which may be used to extract eye tracking information relating to the eye, such as gaze direction, movement direction, psychological state, etc.

In some embodiments, the optical sensor 310 may include a processor configured to process the received signal light 308 to generate an image of the eye 115. In some embodiments, the processor may further analyze the generated image of the eye 115 to obtain information that may be used for eye tracking and other purposes, such as for determining what information to present to the user, for configuring the layout of the presentation of the information, for addressing vergence-accommodation conflict, etc. In some embodiments, the processor may also process the received signal light 308 to generate an image of the face. In some embodiments, the processor may further analyze the generated image of the face to obtain information that may be used for the depth reconstruction of the face. In some embodiments, the optical sensor 310 may also include a non-transitory computer-readable storage medium (e.g., a computer-readable memory) configured to store data, such as the generated images. In some embodiments, the non-transitory computer-readable storage medium may store codes or instructions that may be executable by the processor to perform various steps of any methods disclosed herein.

In some embodiments, the processor and the non-transitory computer-readable medium may be provided separately from the optical sensor 310. For example, the object tracking system 300 may include a controller 325 communicatively connected with the optical sensor 310 and configured to receive data from the optical sensor 310. The controller 325 may include a processor or processing unit 321 and a storage device 323. The processor 321 may by any suitable processor, such as a central processing unit ("CPU"), a graphic processing unit ("GPU"), etc. The storage device 323 may be a non-transitory computer-readable medium, such as a memory, a hard disk, etc. The storage device 323 may be configured to store data or information, including computer-executable program instructions or codes, which may be executed by the processor 321 to perform various controls or functions of the methods or processes disclosed herein. For example, the controller 325 may be configured to analyze the data (e.g., signals) received from the optical sensor 310 to obtain information for eye tracking or other purposes. In some embodiments, the controller 325 may be implemented in the optical sensor 310.

In some embodiments, the illumination system may also include one or more (e.g., two) retardation films 165 coupled to the illuminators 110. In some embodiments, the retardation films 165 may be disposed at a side (or surface) of the illuminator 110 facing the light source 105 and the eye 115. The retardation film 165 may be configured to provide a predetermined phase retardation (or predetermined phase retardation profile) to the light 304 deflected by the illuminator 110 to re-configure, control, alter, affect, vary, change, modify, or maintain the polarization of the light 304 for illuminating the eye 115 (and the face). In some embodiments, the signal light deflecting element 305 may also be coupled to a retardation film 165. In some embodiments, the retardation film 165 may be disposed at a side (or surface) of the signal light deflecting element 305 facing the light source 105 and the eye 115. The retardation film 165 coupled to the signal light deflecting element 305 may be disposed between the illuminators 110. The retardation film 165 may be configured to provide a predetermined phase retardation (or predetermined phase retardation profile) to the signal light 308 deflected by the signal light deflecting element 305 to re-configure, control, alter, affect, vary, change, modify, or maintain the polarization of the signal light 308.

Due to the nature of the pupil 116, the iris 117, and the sclera 118 of the eye 115, the pupil 116, the iris 117, and the sclera 118 may reflect lights of different polarizations (or polarization degrees). In some embodiments, through configuring the polarization of the light 304 for illuminating the eye 115 and/or the polarization of the signal light 308, the optical sensor 310 may generate an image including the polarization information of the pupil 116, the iris 117, and the sclera 118 of the eye 115, with a significantly increased contrast between the pupil 116, the iris 117, and the sclera 118. Thus, more information relating to the eye 115 may be extracted from the image generated by the pixelated polarized camera 380, thereby enhancing the accuracy of eye tracking.

Figure 3B:
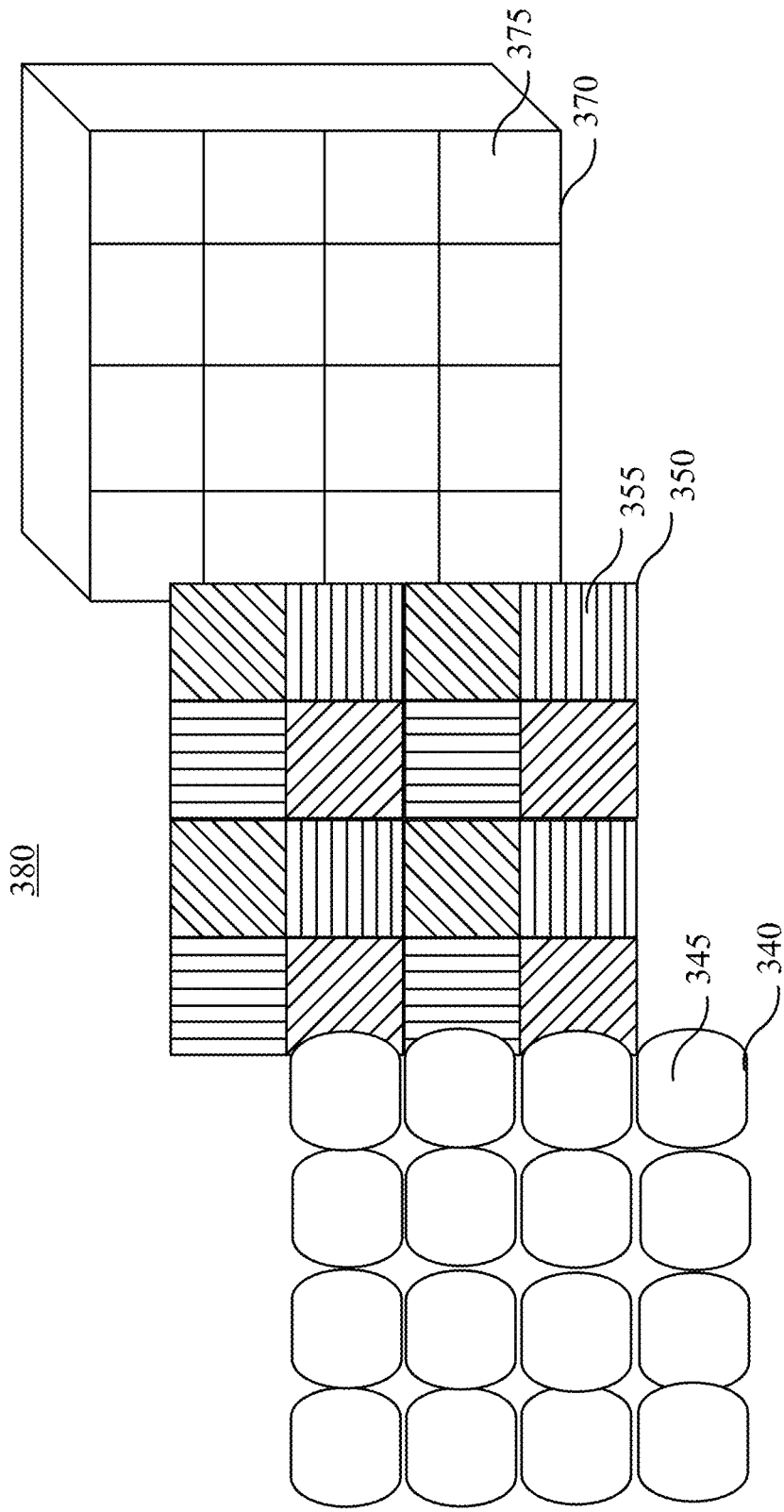
FIG. 3B illustrates an exploded view of a schematic structure of a pixelated polarized imaging device that may be included in the object tracking system shown in FIG. 3A, according to an embodiment of the present disclosure.

In some embodiments, the optical sensor 310 may include a polarized image sensor (e.g., pixelated polarized camera) configured to receive the signal light 308, and generate one or more images of the eye 115. In some embodiments, the one or more images may include the intensity information and polarization information of the eye 115 (and the face). FIG. 3B illustrates an exploded view of a schematic structure of a pixelated polarized camera 380 that may be included in the optical sensor 310, according to an embodiment of the present disclosure. The pixelated polarized camera 380 may be configured to have a designed operating wavelength band that includes at least a portion of the IR spectrum. As shown in FIG. 3B, the pixelated polarized camera 380 may include an on-chip micro-lens array 340, a pixel-level micro-polarizer array 350, and a photo diode array 370 aligned and stacked together. The on-chip micro-lens array 340 may include a plurality of lenses 345 arranged in a matrix configuration. The micro-polarizer array 350 may include a plurality of polarization selective structures 355 (e.g., each functions as a micro-polarizer) arranged corresponding to the plurality of lenses 345 in the on-chip micro-lens array 340. Each of the polarization selective structures 355 may be configured with a predetermined polarization orientation, such that a light of a predetermined polarization may transmit through the polarization selective structure, whereas lights of other polarizations may be blocked. For example, FIG. 3B shows that the micro-polarizer array 350 may include polarization selective structures 355 with 0-degree, 45-degree, 90-degree, and 135-degree polarization orientations. In some embodiments, the micro-polarizer array 350 may include pixelated wire-grid polarizers.

The photo diode array 370 may include a plurality of photo diodes 375 arranged corresponding to the plurality of polarization selective structures 355, and configured to receive the light transmitted through the corresponding polarization selective structures 355. In some embodiments, the plurality of photo diodes 375, the plurality of polarization selective structures 355, and the plurality of lenses 345 may be arranged one-to-one corresponding to one another. In some embodiments, the on-chip micro-lens array 340 may be omitted in the pixelated polarized camera 380. Through using the pixelated polarized camera 380, each photo diode 375 may receive a light of a predetermined polarization, such as a light of 0-degree, 45-degree, 90-degree, or 135-degree polarization direction. Separate images may be generated based on the received lights of different polarizations, or a single image may be generated based on a combination of the lights of different polarizations.

In some embodiments, the pixelated polarized camera 380 may receive the signal light 308, and generate an image including the polarization information of the pupil 116, the iris 117, and the sclera 118 of the eye 115, with a significantly increased contrast between the pupil 116, the iris 117, and the sclera 118. Thus, more information relating to the eye 115 may be extracted from the image generated by the pixelated polarized camera 380, thereby enhancing the accuracy of eye tracking.

Figure 4:
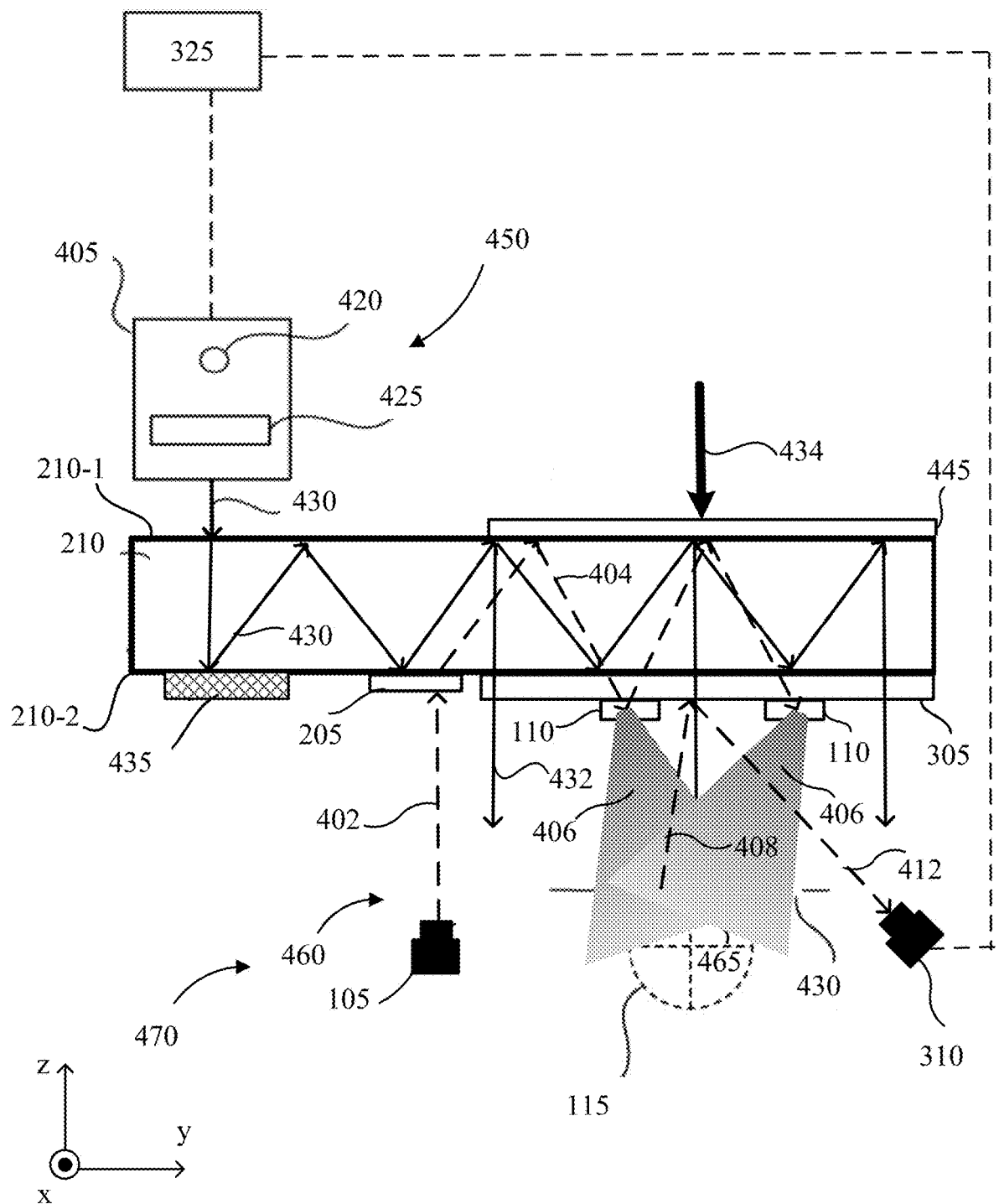
FIG. 4 illustrates a schematic diagram of an optical system including a light guide display assembly and an eye tracking assembly, according to an embodiment of the present disclosure.

FIG. 4 illustrates a schematic diagram of an optical system 400, according to an embodiment of the present disclosure. The optical system 400 may be a part of a system (e.g., an NED, an HUD, an HMD, a smart phone, a laptop, or a television, etc.) for VR, AR, and/or MR applications. As shown in FIG. 4, the optical system 400 may include a light guide display assembly 450 and an object tracking assembly 470. For discussion purposes, the object tracking assembly 470 may be an eye tracking (and face tracking) assembly 470. The eye tracking (and face tracking) assembly 470 may include an illumination system 460, which may an embodiment of the illumination systems disclosed herein, such as the illumination system 100 shown in FIGS. 1A-1C, the illumination system 160 shown in FIG. 1D, the illumination system 170 shown in FIG. 1E, the illumination system 200 shown in FIG. 2A, the illumination system 230 shown in FIG. 2B, the illumination system 260 shown in FIG. 2C, or the illumination system 270 shown in FIGS. 2D-2F. Detailed descriptions of the same or similar elements, structures, and/or functions may refer to the above descriptions rendered in connection with FIGS. 1A-2F. The eye tracking (and face tracking) assembly 470 may also include elements, structures, and/or functions that are the same as or similar to those included in the object tracking system 300 shown in FIGS. 3A and 3B. Detailed descriptions of the same or similar elements, structures, and/or functions may refer to the above descriptions rendered in connection with FIGS. 1A-1C.

As shown in FIG. 4, for discussion purposes, the eye tracking (and face tracking) assembly 470 may include an illumination system that is similar to the illumination system 200 shown in FIG. 2A. For example, the illumination system may include one or more light sources 105, the light guide 210, one or more in-coupling elements 205 coupled to the light guide 210, and one or more illuminators (or illuminating elements) 110 coupled to the light guide 210. The one or more light sources 105 may be configured to emit one or more IR lights 402 toward the one or more in-coupling elements 205. In FIG. 4, an IR light is denoted by a dashed line with an arrow. The one or more in-coupling elements 205 may couple the one or more IR lights 402 into the light guide 210 as one or more IR lights 404 propagating inside the light guide 210 toward the one or more illuminators 110 via TIR. The one or more illuminators 110 may be configured to couple the one or more IR lights 404 out of the light guide 210 as one or more IR lights 406 for illuminating the eye 115. For discussion purposes, FIG. 4 shows that the illumination system includes one light source 105, one in-coupling element 205 and two illuminators 110. The in-coupling element 205 and the illuminators 110 may be coupled to the light guide 210. For illustrative purposes, FIG. 4 shows that the in-coupling element 205 and the illuminators 110 are disposed at the second surface 210-2 of the light guide 210.

The eye tracking (and face tracking) assembly 470 may also include the signal light deflecting element 305 arranged facing the eye 115, and one or more optical sensors (or imaging devices) 310. For illustrative purposes, FIG. 4 shows that the eye tracking (and face tracking) assembly 470 includes one optical sensor 310. The eye 115 may reflect the IR lights 406 as one or more reflected IR lights 408 propagating toward the signal light deflecting element 305. FIG. 4 shows one reflected IR light 408 for illustrative purposes. The signal light deflecting element 305 may deflect the IR light 408 reflected by the eye 115 to the optical sensor 310. For example, the signal light deflecting element 305 may deflect the IR light 408 reflected by the eye 115 as an IR light 412 propagating toward the optical sensor 310. Based on the IR light 412, the optical sensor 310 may generate one or more images of the eye 115 including the eye (and face) tracking information.

The light guide display assembly 450 may provide pupil-replication (or pupil-expansion). The light guide display assembly 450 may offer eye-glasses form factors, a moderately large field of view ("FOV"), a high transmittance, and a large eye-box. As shown in FIG. 4, the light guide display assembly 450 may include a light source assembly 405, the light guide 210, and the controller 325. In the embodiment shown in FIG. 4, the light guide display assembly 450 and the eye tracking (and face tracking) assembly 470 share the light guide 210 and the controller 325. In some embodiments, the light guide display assembly 450 and the eye tracking (and face tracking) assembly 470 may have individual light guides and/or individual controllers.

The light source assembly 405 may include a light source 420 and an light conditioning system 425. In some embodiments, the light source 420 may be a light source configured to generate a coherent or partially coherent light. The light source 420 may include, e.g., a laser diode, a vertical cavity surface emitting laser, a light emitting diode, or a combination thereof. In some embodiments, the light source 420 may be a display panel, such as a liquid crystal display ("LCD") panel, a liquid-crystal-on-silicon ("LCoS") display panel, a light-emitting diode ("LED") display panel, an organic light-emitting diode ("OLED") display panel, a micro light-emitting diode ("micro-LED") display panel, a micro organic light-emitting diode ("micro-OLED") display panel, a digital light processing ("DLP") display panel, a laser scanning display panel, or a combination thereof. In some embodiments, the light source 420 may be a self-emissive panel, such as an LED display panel, an OLED display panel, a micro-OLED display panel, or a micro-LED display panel. In some embodiments, the light source 420 may be a display panel that is illuminated by an external source, such as an LCD panel, an LCoS display panel, or a DLP display panel. Examples of an external source may include a laser, an LED, an OLED, or a combination thereof. The light conditioning system 425 may include one or more optical components configured to condition the light from the light source 420. For example, the controller 325 may control the light conditioning system 425 to condition the light from the light source 420, which may include, e.g., transmitting, attenuating, expanding, collimating, and/or adjusting orientation of the light.

The light source assembly 405 may generate and output an image light (e.g., a visible light) 430 propagating toward an in-coupling element 435 disposed at a first portion of the light guide 210. In FIG. 4, a visible light is denoted by a solid line with an arrow. The light guide 210 may expand and direct the image light 430 to the eye 115 positioned in an eye-box 430 of the light guide display assembly 450. An exit pupil 465 may be a location where the eye 115 is positioned in the eye-box 430. The in-coupling element 435 located at the first portion of the light guide 210 may receive the image light 430, and couple the image light 430 into a TIR path inside the light guide 210. The image light 430 may propagate inside the light guide 210 through TIR toward an out-coupling element 445 located at a second portion of the light guide 210. The first portion and the second portion may be located at different portions of the light guide 210. The out-coupling element 445 may be configured to couple the image light 430 out of the light guide 210 toward the eye 115.

The light guide 210 may include a first surface or side 410-1 facing the real-world environment and an opposing second surface or side 410-2 facing the eye 115. Each of the in-coupling element 435 and the out-coupling element 445 may be disposed at the first surface 410-1 or the second surface 410-2 of the light guide 210. In some embodiments, as shown in FIG. 4, the in-coupling element 435 may be disposed at the second surface 410-2 of the light guide 210, and the out-coupling element 445 may be disposed at the first surface 410-1 of the light guide 210. In some embodiments, the in-coupling element 435 may be disposed at the first surface 410-1 of the light guide 210. In some embodiments, the out-coupling element 445 may be disposed at the second surface 410-2 of the light guide 210. In some embodiments, both of the in-coupling element 435 and the out-coupling element 445 may be disposed at the first surface 410-1 or the second surface 410-2 of the light guide 210. In some embodiments, the in-coupling element 435 or the out-coupling element 445 may be integrally formed as a part of the light guide 210 at the corresponding surface. In some embodiments, the in-coupling element 435 or the out-coupling element 445 may be separately formed, and may be disposed at (e.g., affixed to) the corresponding surface.

In some embodiments, each of the in-coupling element 435 and the out-coupling element 445 may have a designed operating wavelength band that includes at least a portion of the visible wavelength band. In some embodiments, the designed operating wavelength band of each of the in-coupling element 435 and the out-coupling element 445 may not include the IR wavelength band. For example, each of the in-coupling element 435 and the out-coupling element 445 may be configured to deflect a visible light, and transmit an IR light without a deflection or with negligible deflection.

In some embodiments, each of the in-coupling element 435 and the out-coupling element 445 may include one or more diffraction gratings, one or more cascaded reflectors, one or more prismatic surface elements, and/or an array of holographic reflectors, or any combination thereof. In some embodiments, each of the in-coupling element 435 and the out-coupling element 445 may include one or more diffraction gratings, such as a surface relief element (e.g., an SRG), a volume hologram, a polarization selective grating, a polarization volume hologram ("PVH"), a metasurface grating, or any combination thereof. In some embodiments, a period of the diffraction grating included in the in-coupling element 435 may be configured to enable TIR of the image light 430 within the light guide 210. In some embodiments, a period of the diffraction grating included in the out-coupling element 445 may be configured to couple the image light 430 propagating inside the light guide 210 through TIR out of the light guide 210 via diffraction.

The controller 325 may be communicatively coupled with the light source assembly 405, and may control the operations of the light source assembly 405. In some embodiments, the light guide 210 may output the expanded image light 430 to the eye 115 with an increased or expanded field of view ("FOV"). The light guide 210 coupled with the in-coupling element 435 and the out-coupling element 445 may also function as an image combiner (e.g., AR or MR combiner). The light guide 210 may combine the image light 432 representing a virtual image and a light 434 from the real world environment (or a real world light 434), such that the virtual image may be superimposed with real-world images. With the light guide display assembly 450, the physical display and electronics may be moved to a side of a front body of an NED. A substantially fully unobstructed view of the real world environment may be achieved, which enhances the AR or MR user experience.

The signal light deflecting element (or eye tracking combiner) 305 and the illuminators (or illumination combiner) 110 included in the eye tracking (and face tracking) assembly 470 may substantially transmit both of the image light 432 coupled out from the light guide 210 and the real world light 434, without deflection or with negligible deflection. The image light 432 and the real world light 434 may propagate through the signal light deflecting element (or eye tracking combiner) 305 and the illuminators (or illumination combiner) 110 toward the eye 115.

In some embodiments, the light guide 210 may include additional elements configured to redirect, fold, and/or expand the pupil of the light source assembly 405. For example, in some embodiments, the light guide display assembly 450 may include a redirecting element (not shown) coupled to the light guide 210, and configured to redirect the image light 430 to the out-coupling element 445, such that the image light 430 is coupled out of the light guide 210 via the out-coupling element 445. In some embodiments, the redirecting element may be arranged at a location of the light guide 210 opposing the location of the out-coupling element 445. For example, in some embodiments, the redirecting element may be integrally formed as a part of the light guide 210 at the corresponding surface. In some embodiments, the redirecting element may be separately formed and disposed at (e.g., affixed to) the corresponding surface of the light guide 210.

In some embodiments, the redirecting element and the out-coupling element 445 may have a similar structure. In some embodiments, the redirecting element may include one or more diffraction gratings, one or more cascaded reflectors, one or more prismatic surface elements, and/or an array of holographic reflectors, or any combination thereof. In some embodiments, the redirecting element may include one or more diffraction gratings, such as a surface relief element (e.g., an SRG), a volume hologram, a polarization selective grating, a polarization volume hologram, a metasurface grating, or any combination thereof. In some embodiments, multiple functions, e.g., redirecting, folding, and/or expanding the pupil of the light generated by the light source assembly 405 may be combined into a single element, e.g. the out-coupling element 445.

In some embodiments, the light guide display assembly 450 may include a plurality of light guides 210 disposed in a stacked configuration (not shown in FIG. 4). At least one (e.g., each) of the plurality of light guides 210 may be coupled with or include one or more diffractive elements (e.g., in-coupling element, out-coupling element, and/or redirecting element), which may be configured to direct the image light 430 toward the eye 115. In some embodiments, the plurality of light guides 210 disposed in the stacked configuration may be configured to output an expanded polychromatic image light (e.g., a full-color image light). In some embodiments, the light guide display assembly 450 may include one or more light source assemblies 405 and/or one or more light guides 210. In some embodiments, at least one (e.g., each) of the light source assemblies 405 may be configured to emit a monochromatic image light of a specific wavelength band corresponding to a primary color (e.g., red, green, or blue) and a predetermined FOV (or a predetermined portion of an FOV).

In some embodiments, the light guide display assembly 450 may include three different light guides 210 configured to deliver component color images (e.g., primary color images) by in-coupling and subsequently out-coupling, e.g., red, green, and blue lights, respectively, in any suitable order. In some embodiments, the light guide display assembly 450 may include two different light guides configured to deliver component color images (e.g., primary color images) by in-coupling and subsequently out-coupling, e.g., a combination of red and green lights, and a combination of green and blue lights, respectively, in any suitable order. In some embodiments, at least one (e.g., each) of the light source assemblies 405 may be configured to emit a polychromatic image light (e.g., a full-color image light). The relative positions of the eye 115 and the light source assembly 405 shown in FIG. 4 are for illustrative purposes. In some embodiments, the eye 115 and the light source assembly 405 may be disposed at the same side of the light guide 210.

The configuration of the object tracking assembly 300 shown in FIG. 3A or the object tracking assembly 470 shown in FIG. 4 is used as an example structure in illustrating and explaining the operation principles of using a disclosed illumination system (e.g., the illumination system 360 shown in FIG. 3A or 460 shown in FIG. 4) to provide an in-field illumination to an object (e.g., the eye 115), such as for the central region of the eye 115, thereby increasing the eye tracking range and eye tracking accuracy. The operation principles of using any disclosed illumination system to provide an in-field illumination to an object and enhance the tracking range and tracking accuracy of the object may be applicable to any suitable object tracking systems other than the disclosed object tracking assembly 300 shown in FIG. 3A or object tracking assembly 470 shown in FIG. 4.

The configuration of the optical system 400 shown in FIG. 4 is used as an example structure that includes both of a display assembly (e.g., the light guide display assembly 450) and an object tracking assembly including a disclosed illumination system (e.g., the illumination system 460 shown in FIG. 4). The configuration of the light guide display assembly 450 is used as an example structure that may be used in combination with a disclosed illumination system (e.g., the illumination system 460 shown in FIG. 4). Other display assemblies may also be used in combination with a disclosed illumination system.

Figure 5A:
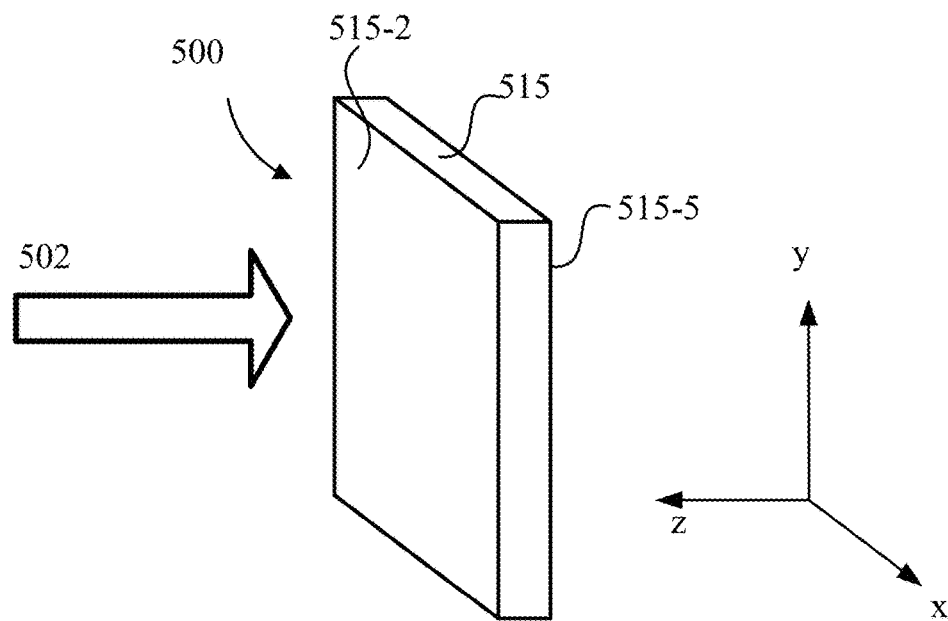
FIG. 5A schematically illustrates a three-dimensional ("3D") view of a polarization volume hologram ("PVH") element, according to an embodiment of the present disclosure.

FIG. 5A illustrates a schematic three-dimensional ("3D") view of a PVH element 500 with a light 502 incident onto the PVH element 500 along a −z-axis, according to an embodiment of the present disclosure. FIGS. 5B-5F schematically illustrate various views of a portion of the PVH element 500 shown in FIG. 5A, showing in-plane orientations of optically anisotropic molecules in the PVH element 500, according to various embodiments of the present disclosure. FIGS. 5G-5I schematically illustrate various diagrams of a portion of the PVH element 500 shown in FIG. 5A, showing out-of-plane orientations of optically anisotropic molecules in the PVH element 500, according to various embodiments of the present disclosure.

As shown in FIG. 5A, although the PVH element 500 is shown as a rectangular plate shape for illustrative purposes, the PVH element 500 may have any suitable shape, such as a circular shape. In some embodiments, one or both surfaces along the light propagating path of the light 502 may have curved shapes. In some embodiments, the PVH element 500 may be fabricated based on a birefringent medium, e.g., liquid crystal ("LC") materials, which may have an intrinsic orientational order of optically anisotropic molecules that may be locally controlled during the fabrication process. In some embodiments, the PVH element 500 may be fabricated based on a photosensitive polymer, such as an amorphous polymer, an LC polymer, etc., which may generate an induced (e.g., photo-induced) optical anisotropy and/or an induced (e.g., photo-induced) optic axis orientation. In some embodiments, the PVH element 500 may be fabricated based on meta materials.

In some embodiments, the PVH element 500 may include a birefringent medium (e.g., an LC material) in a form of a layer, which may be referred to as a birefringent medium layer (e.g., an LC layer) 515. The birefringent medium layer 515 may have a first surface 515-1 on one side and a second surface 515-2 on an opposite side. The first surface 515-1 and the second surface 515-2 may be surfaces along the light propagating path of the incident light 502. The birefringent medium layer 515 may include optically anisotropic molecules (e.g., LC molecules) configured with a three-dimensional ("3D") orientational pattern to provide a polarization selective optical response. In some embodiments, an optic axis of the LC material may be configured with a spatially varying orientation in at least one in-plane direction. For example, the optic axis of the LC material may periodically or non-periodically vary in at least one in-plane linear direction, in at least one in-plane radial direction, in at least one in-plane circumferential (e.g., azimuthal) direction, or a combination thereof. The LC molecules may be configured with an in-plane orientation pattern, in which the directors of the LC molecules may periodically or non-periodically vary in the at least one in-plane direction. In some embodiments, the optic axis of the LC material may also be configured with a spatially varying orientation in an out-of-plane direction. The directors of the LC molecules may also be configured with spatially varying orientations in an out-of-plane direction. For example, the optic axis of the LC material (or directors of the LC molecules) may twist in a helical fashion in the out-of-plane direction.

FIGS. 5B-5F schematically illustrate x-y sectional views of a portion of the PVH element 500 shown in FIG. 5A, showing in-plane orientations of the optically anisotropic molecules 512 in the PVH element 500, according to various embodiments of the present disclosure. For discussion purposes, rod-like LC molecules 512 are used as examples of the optically anisotropic molecules 512 of the birefringent medium layer 515. The rod-like LC molecule 512 may have a longitudinal axis (or an axis in the length direction) and a lateral axis (or an axis in the width direction). The longitudinal axis of the LC molecule 512 may be referred to as a director of the LC molecule 512 or an LC director. An orientation of the LC director may determine a local optic axis orientation or an orientation of the optic axis at a local point of the birefringent medium layer 515. The term "optic axis" may refer to a direction in a crystal. A light propagating in the optic axis direction may not experience birefringence (or double refraction). An optic axis may be a direction rather than a single line: lights that are parallel to that direction may experience no birefringence. The local optic axis may refer to an optic axis within a predetermined region of a crystal. For illustrative purposes, the LC directors of the LC molecules 512 shown in FIGS. 5B-5F are presumed to be in the surface of the birefringent medium layer 515 or in a plane parallel with the surface with substantially small tilt angles with respect to the surface.

Figure 5B:
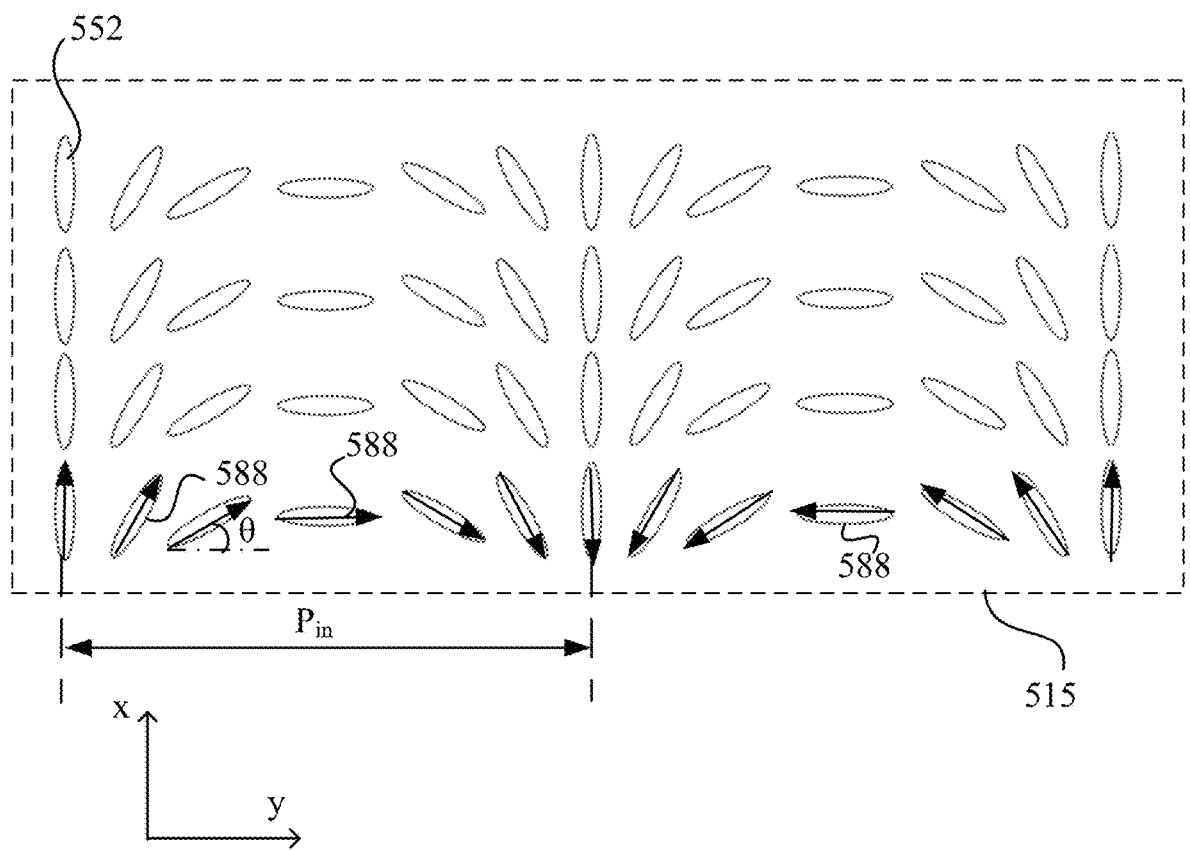
FIGS. 5B-5F schematically illustrate various diagrams of a portion of the PVH element shown in FIG. 5A, showing in-plane orientations of optically anisotropic molecules in the PVH element, according to various embodiments of the present disclosure.

FIG. 5B schematically illustrate an x-y sectional view of a portion of the PVH element 500, showing a periodic in-plane orientation pattern of the orientations of the LC directors (indicated by arrows 588 in FIG. 5B) of the LC molecules 512 located in close proximity to or at a surface (e.g., at least one of the first surface 515-1 or the second surface 515-2) of the birefringent medium layer 515. The orientations of the LC directors located in close proximity to or at the surface of the birefringent medium layer 515 may exhibit a periodic rotation in at least one in-plane direction (e.g., a y-axis direction). The periodically varying in-plane orientations of the LC directors form a pattern. The in-plane orientation pattern of the LC directors shown in FIG. 5B may also be referred to as a grating pattern. Accordingly, the PVH element 500 may function as a polarization selective grating, e.g., a PVH grating.

As shown in FIG. 5B, the LC molecules 512 located in close proximity to or at a surface (e.g., at least one of the first surface 515-1 or the second surface 515-2) of the birefringent medium layer 515 may be configured with orientations of LC directors continuously changing (e.g., rotating) in a predetermined direction (e.g., a y-axis direction) along the surface (or in a plane parallel with the surface). The continuous rotation of orientations of the LC directors may form a periodic rotation pattern with a uniform (e.g., same) in-plane pitch $P_{in}$. The predetermined direction may be any suitable direction along the surface (or in a plane parallel with the surface) of the birefringent medium layer 515. For illustrative purposes, FIG. 5B shows that the predetermined direction is the x-axis direction. The predetermined direction may be referred to as an in-plane direction, the pitch $P_{in}$ along the in-plane direction may be referred to as an in-plane pitch or a horizontal pitch. The pattern with the uniform (or same) in-plane pitch $P_{in}$ may be referred to as a periodic LC director in-plane orientation pattern. The in-plane pitch $P_{in}$ is defined as a distance along the in-plane direction (e.g., the x-axis direction) over which the orientations of the LC directors exhibit a rotation by a predetermined value (e.g., 180°). In other words, in a region substantially close to (including at) the surface of the birefringent medium layer 515, local optic axis orientations of the birefringent medium layer 515 may vary periodically in the in-plane direction (e.g., the x-axis direction) with a pattern having the uniform (or same) in-plane pitch $P_{in}$.

In addition, in regions located in close proximity to or at the surface (e.g., at least one of the first surface 515-1 or the second surface 515-2) of the birefringent medium layer 515, the orientations of the directors of the LC molecules 512 may exhibit a rotation in a predetermined rotation direction, e.g., a clockwise direction or a counter-clockwise direction. Accordingly, the rotation of the orientations of the directors of the LC molecules 512 in regions located in close proximity to or at the surface of the birefringent medium layer 515 may exhibit a handedness, e.g., right handedness or left handedness. In the embodiment shown in FIG. 5B, in regions located in close proximity to or at the surface of the birefringent medium layer 515, the orientations of the directors of the LC molecules 512 may exhibit a rotation in a clockwise direction. Accordingly, the rotation of the orientations of the directors of the LC molecules 512 in regions located in close proximity to or at the surface of the birefringent medium layer 515 may exhibit a left handedness.

Although not shown, in some embodiments, in regions located in close proximity to or at the surface (e.g., at least one of the first surface 515-1 or the second surface 515-2) of the birefringent medium layer 515, the orientations of the directors of the LC molecules 512 may exhibit a rotation in a counter-clockwise direction. Accordingly, the rotation of the orientations of the directors of the LC molecules 512 in regions located in close proximity to or at the surface of the birefringent medium layer 515 may exhibit a right handedness. Although not shown, in some embodiments, in regions located in close proximity to or at the surface of the birefringent medium layer 515, domains in which the orientations of the directors of the LC molecules 512 exhibit a rotation in a clockwise direction (referred to as domains DL) and domains in which the orientations of the directors of the LC molecules 512 exhibit a rotation in a counter-clockwise direction (referred to as domains DR) may be alternatingly arranged in at least one in-plane direction, e.g., in x-axis and y-axis directions.

Figure 5C:
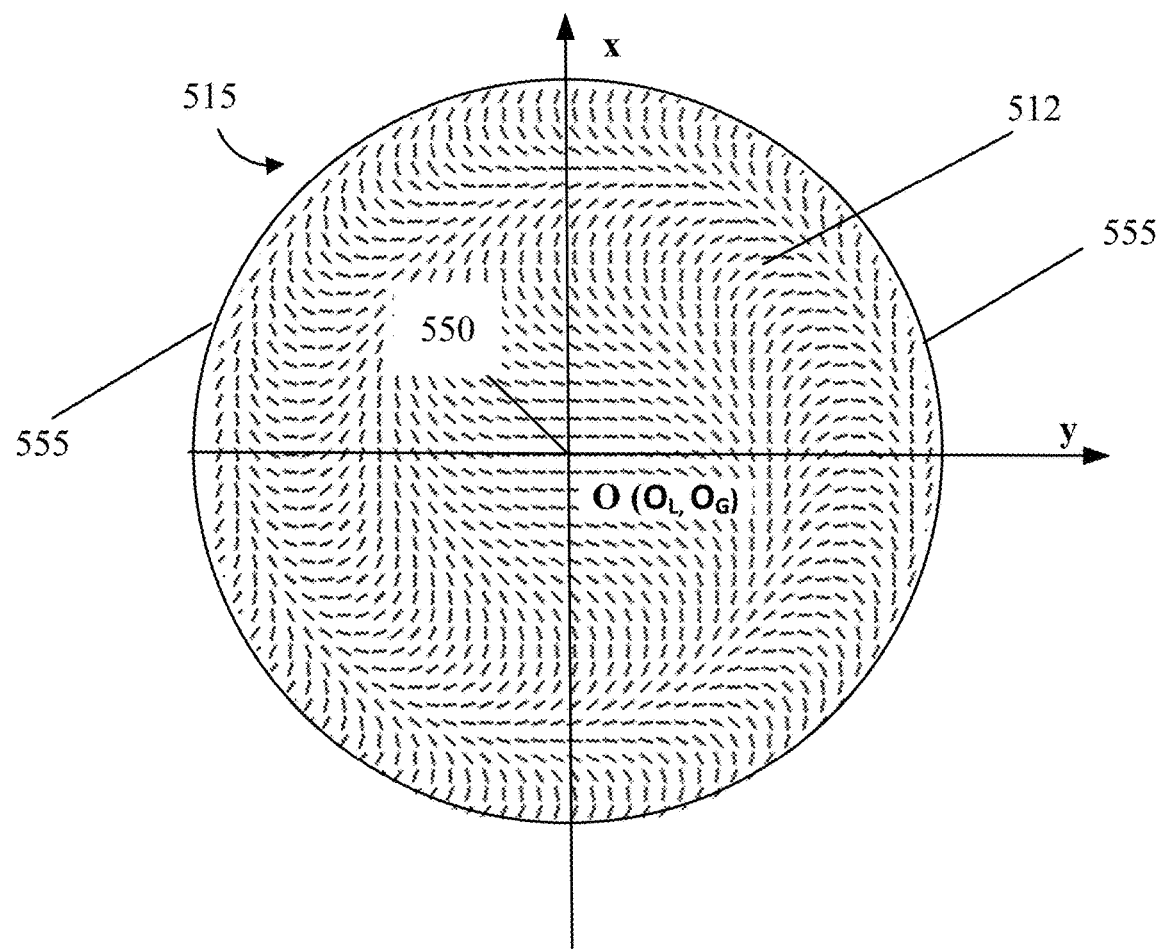
Figure 5D:
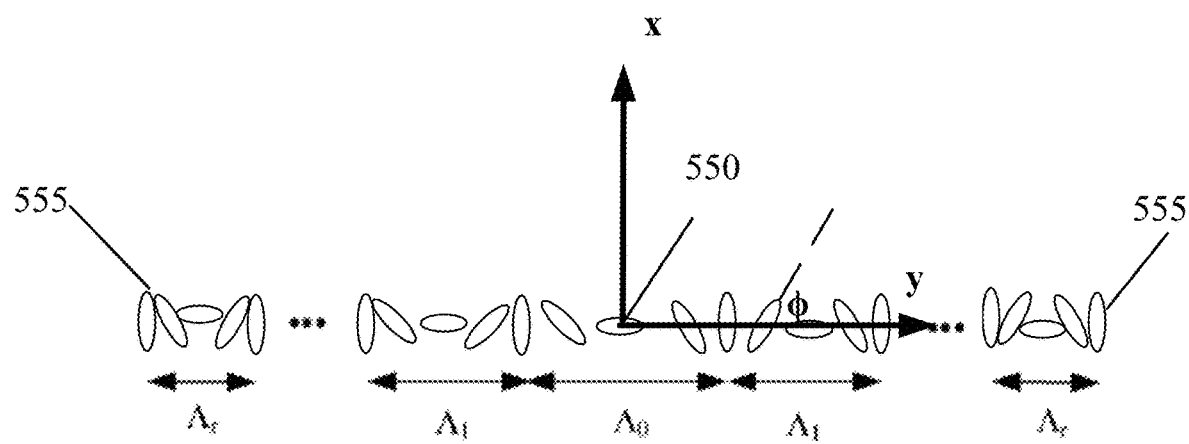

FIG. 5C schematically illustrates an x-y sectional view of a portion of the PVH element 500, showing a radially varying in-plane orientation pattern of the orientations of the LC directors of the LC molecules 512 located in close proximity to or at a surface (e.g., at least one of the first surface 515-1 or the second surface 515-2) of the birefringent medium layer 515 shown in FIG. 5A. FIG. 5D illustrates a section of the in-plane orientation pattern taken along a y-axis in the birefringent medium layer 515 shown in FIG. 5C, according to an embodiment of the present disclosure. In some embodiments, the PVH element 500 with the LC director orientations shown in FIGS. 5C and 5D may function as an on-axis focusing PVH lens.

As shown in FIG. 5C, the orientations of the LC molecules 512 located in close proximity to or at a surface (e.g., at least one of the first surface 515-1 or the second surface 515-2) of the birefringent medium layer 515 may be configured with an in-plane orientation pattern having a varying pitch in at least two opposite in-plane directions from a lens center ("O") 550 to opposite lens peripheries 555. For example, the orientations of the LC directors of LC molecules 512 located in close proximity to or at the surface of the birefringent medium layer 515 may exhibit a continuous rotation in at least two opposite in-plane directions (e.g., a plurality of opposite radial directions) from the lens center 550 to the opposite lens peripheries 555 with a varying pitch. The orientations of the LC directors from the lens center 550 to the opposite lens peripheries 555 may exhibit a rotation in a same rotation direction (e.g., clockwise, or counter-clockwise). A pitch $\Lambda$ of the in-plane orientation pattern may be defined as a distance in the in-plane direction (e.g., a radial direction) over which the orientations of the LC directors (or azimuthal angles $\phi$ of the LC molecules 512) change by a predetermined angle (e.g., 180°) from a predetermined initial state.

As shown in FIG. 5D, according to the LC director field along the x-axis direction, the pitch $\Lambda$ may be a function of the distance from the lens center 550. The pitch $\Lambda$ may monotonically decrease from the lens center 550 to the lens peripheries 555 in the at least two opposite in-plane directions (e.g., two opposite radial directions) in the x-y plane, e.g., $\Lambda_0 > \Lambda_1 > \ldots > \Lambda_r$. $\Lambda_0$ is the pitch at a central region of the lens pattern, which may be the largest. The pitch $\Lambda_r$ is the pitch at a periphery region (e.g., periphery 555) of the lens pattern, which may be the smallest. In some embodiments, the azimuthal angle $\phi$ of the LC molecule 512 may change in proportional to the distance from the lens center 550 to a local point of the birefringent medium layer 515 at which the LC molecule 512 is located. In some embodiments, the in-plane orientation pattern of the orientations of the LC directors shown in FIGS. 5C and 5D may also be referred to as a lens pattern (e.g., a spherical lens pattern).

As shown in FIGS. 5C and 5D, a lens pattern center ($O_L$) and a geometry center ($O_G$) (e.g., a center of lens aperture) of the PVH element 500 functioning as on-axis focusing PVH lens may substantially overlap with one another, at the lens center ("O") 550. The lens pattern center ($O_L$) may be a center of the lens pattern of an on-axis focusing PVH lens, and may also be a symmetry center of the lens pattern. The geometry center ($O_G$) may be defined as a center of a shape of the effective light receiving area (i.e., an aperture) of an on-axis focusing PVH lens.

Figure 5E:
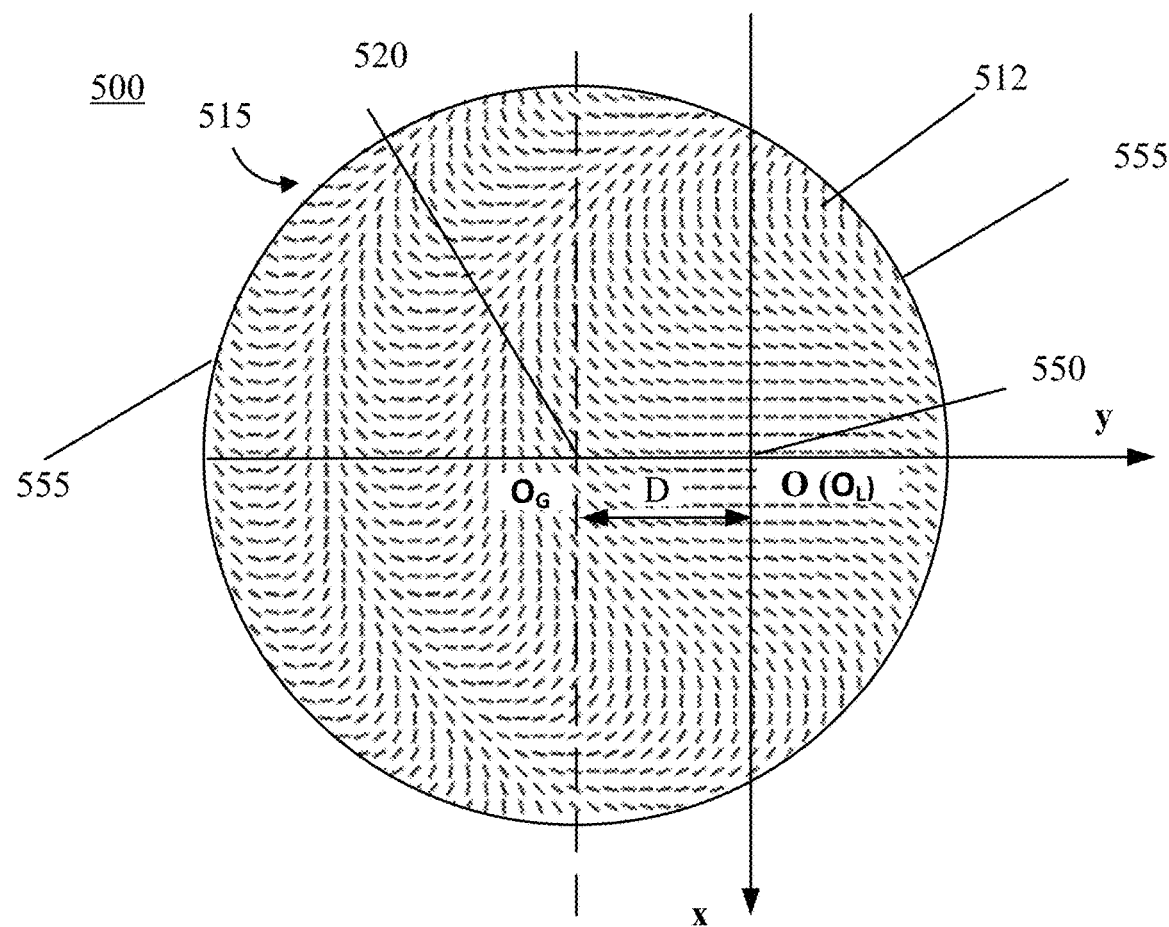
Figure 5F:
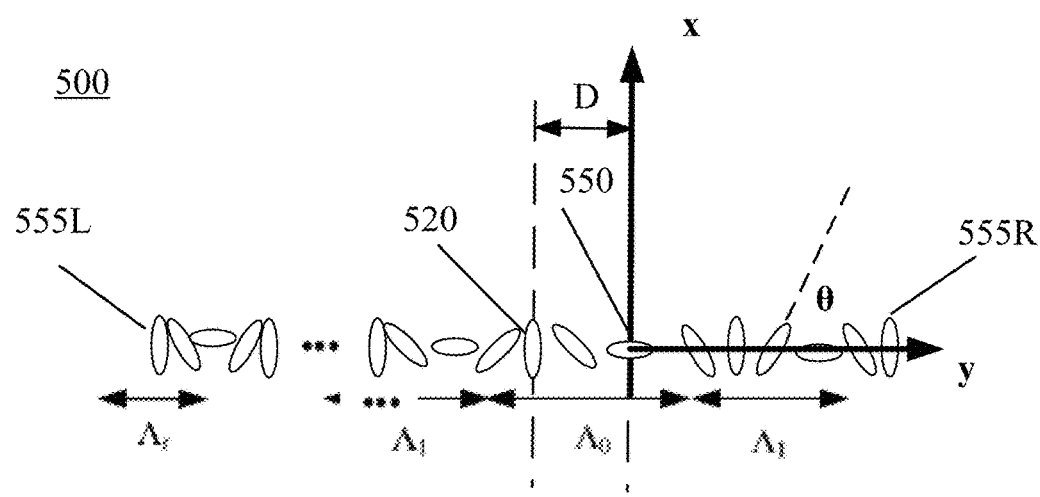
Figure 5G:
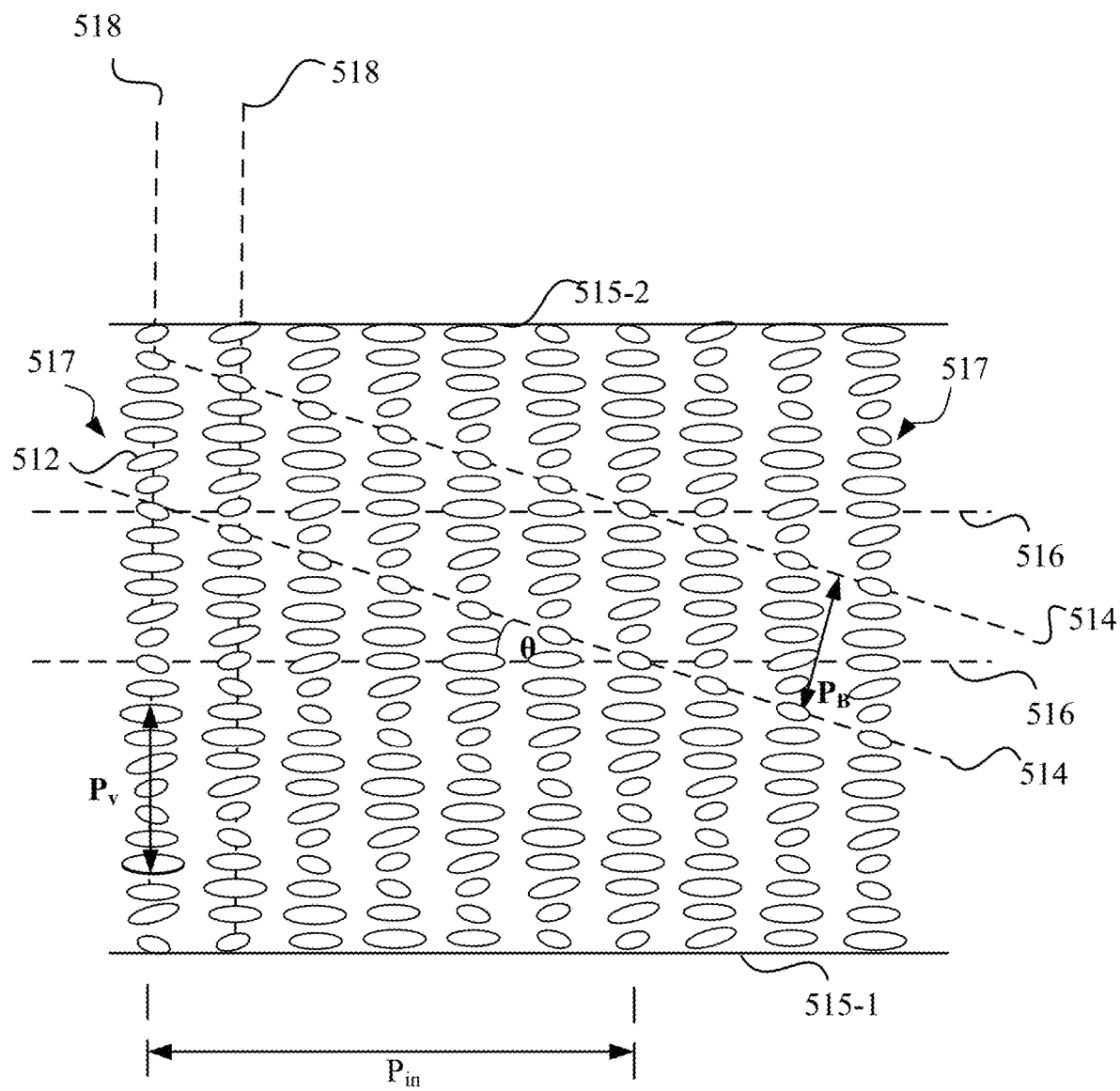
FIGS. 5G-5I schematically illustrate various diagrams of a portion of the PVH element shown in FIG. 5A, showing out-of-plane orientations of optically anisotropic molecules in the PVH element, according to various embodiments of the present disclosure.
Figure 5H:
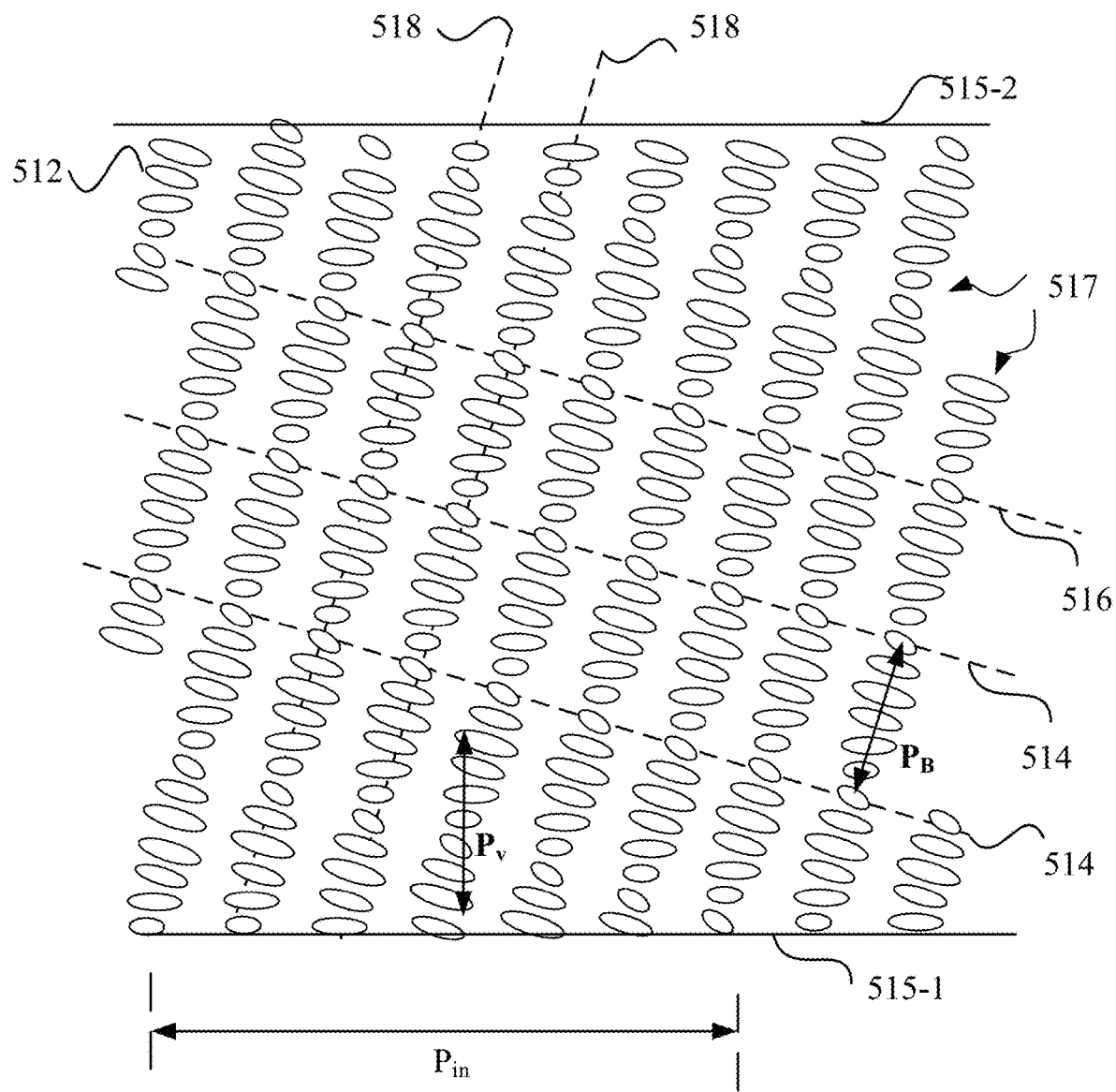
Figure 5I:
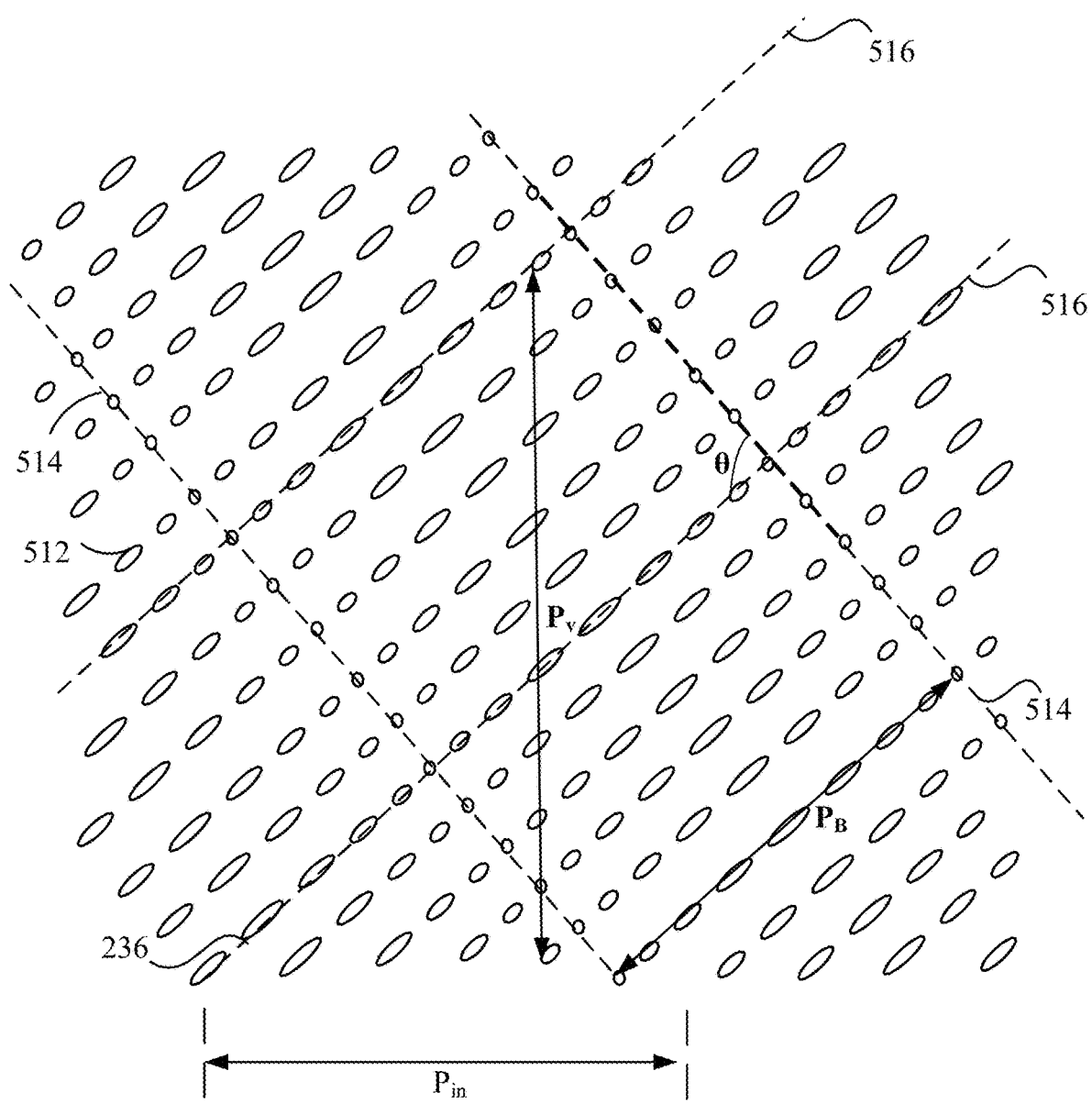

FIG. 5E schematically illustrates an x-y sectional view of a portion of the PVH element 500, showing a radially varying in-plane orientation pattern of the orientations of the LC directors of the LC molecules 512 located in close proximity to or at a surface (e.g., at least one of the first surface 515-1 or the second surface 515-2) of the birefringent medium layer 515 shown in FIG. 5A. FIG. 5F illustrates a section of the in-plane orientation pattern taken along a y-axis in the birefringent medium layer 515 shown in FIG. 5E, according to an embodiment of the present disclosure. In some embodiments, the PVH element 500 with the LC director orientations shown in FIGS. 5E and 5F may function as an off-axis focusing PVH lens.

As shown in FIGS. 5E and 5F, the orientations of the LC molecules 512 located in close proximity to or at a surface (e.g., at least one of the first surface 515-1 or the second surface 515-2) of the birefringent medium layer 515 may be configured with an in-plane orientation pattern having a varying pitch in at least two opposite in-plane directions from a lens pattern center ($O_L$) 550 to opposite lens peripheries 555. The lens pattern center ($O_L$) 550 and a geometry center ($O_G$) 520 of an off-axis focusing PVH lens may not overlap with one another. Instead, the lens pattern center ($O_L$) 550 may be shifted by a predetermined distance D in a predetermined direction (e.g., the y-axis direction in FIGS. 5E and 5F) from the geometry center ($O_G$) 520. An off-axis focusing PVH lens may be considered as a lens obtained by shifting the lens pattern center of a corresponding on-axis focusing PVH lens with respect to the geometry center of the on-axis focusing PVH lens. The lens pattern center of the corresponding on-axis focusing PVH lens may also be a lens pattern center of the off-axis focusing PVH lens. That is, the off-axis focusing PVH lens may have an on-axis focusing counterpart with the same lens pattern center.

The in-plane orientation patterns of the LC directors shown in FIGS. 5B-5F are for illustrative purposes. The PVH element 500 may have any suitable in-plane orientation patterns of the LC directors. For example, in some embodiments, the PVH element 500 may be configured with an in-plane orientation pattern corresponding to a cylindrical lens, an aspheric lens, or a freeform lens, and the PVH element 500 may function as a cylindrical lens, an aspheric lens, or a freeform lens, etc.

FIGS. 5G-5I schematically illustrate y-z sectional views of a portion of the PVH element 500, showing out-of-plane orientations of the LC directors of the LC molecules 512 in the PVH element 500, according to various embodiments of the present disclosure. For discussion purposes, FIGS. 5G-5I schematically illustrate out-of-plane (e.g., along z-axis direction) orientations of the LC directors of the LC molecules 512 when the in-plane (e.g., in a plane parallel to the x-y plane) orientation pattern is a periodic in-plane orientation pattern shown in FIG. 5B.

As shown in FIG. 5G, within a volume of the birefringent medium layer 515, the LC molecules 512 may be arranged in a plurality of helical structures 517 with a plurality of helical axes 518 and a helical pitch $P_h$ along the helical axes. The azimuthal angles of the LC molecules 512 arranged along a single helical structure 517 may continuously vary around a helical axis 518 in a predetermined rotation direction, e.g., clockwise direction or counter-clockwise direction. In other words, the orientations of the LC directors of the LC molecules 512 arranged along a single helical structure 517 may exhibit a continuous rotation around the helical axis 518 in a predetermined rotation direction. That is, the azimuthal angles associated of the LC directors may exhibit a continuous change around the helical axis in the predetermined rotation direction. Accordingly, the helical structure 517 may exhibit a handedness, e.g., right handedness or left handedness. The helical pitch $P_h$ may be defined as a distance along the helical axis 518 over which the orientations of the LC directors exhibit a rotation around the helical axis 518 by 360°, or the azimuthal angles of the LC molecules vary by 360°.

In the embodiment shown in FIG. 5G, the helical axes 518 may be substantially perpendicular to the first surface 515-1 and/or the second surface 515-2 of the birefringent medium layer 515. In other words, the helical axes 518 of the helical structures 517 may be in a thickness direction (e.g., a z-axis direction) of the birefringent medium layer 515. That is, the LC molecules 512 may have substantially small tilt angles (including zero degree tilt angles), and the LC directors of the LC molecules 512 may be substantially orthogonal to the helical axis 518. The birefringent medium layer 515 may have a vertical pitch $P_v$, which may be defined as a distance along the thickness direction of the birefringent medium layer 515 over which the orientations of the LC directors of the LC molecules 512 exhibit a rotation around the helical axis 518 by 180° (or the azimuthal angles of the LC directors vary by 180°). In the embodiment shown in FIG. 5G, the vertical pitch $P_v$ may be half of the helical pitch $P_h$.

As shown in FIG. 5G, the LC molecules 512 from the plurality of helical structures 517 having a first same orientation (e.g., same tilt angle and azimuthal angle) may form a first series of parallel refractive index planes 514 periodically distributed within the volume of the birefringent medium layer 515. Although not labeled, the LC molecules 512 with a second same orientation (e.g., same tilt angle and azimuthal angle) different from the first same orientation may form a second series of parallel refractive index planes periodically distributed within the volume of the birefringent medium layer 515. Different series of parallel refractive index planes may be formed by the LC molecules 512 having different orientations. In the same series of parallel and periodically distributed refractive index planes 514, the LC molecules 512 may have the same orientation and the refractive index may be the same. Different series of refractive index planes 514 may correspond to different refractive indices. When the number of the refractive index planes 514 (or the thickness of the birefringent medium layer) increases to a sufficient value, Bragg diffraction may be established according to the principles of volume gratings. Thus, the periodically distributed refractive index planes 514 may also be referred to as Bragg planes 514. In some embodiments, as shown in FIG. 5G, the refractive index planes 514 may be slanted with respect to the first surface 515-1 or the second surface 515-2. In some embodiments, the refractive index planes 514 may be perpendicular to or parallel with the first surface 515-1 or the second surface 515-2. Within the birefringent medium layer 515, there may exist different series of Bragg planes. A distance (or a period) between adjacent Bragg planes 514 of the same series may be referred to as a Bragg period PB. The different series of Bragg planes formed within the volume of the birefringent medium layer 515 may produce a varying refractive index profile that is periodically distributed in the volume of the birefringent medium layer 515. The birefringent medium layer 515 may diffract an input light satisfying a Bragg condition through Bragg diffraction.

As shown in FIG. 5G, the birefringent medium layer 515 may also include a plurality of LC molecule director planes (or molecule director planes) 516 arranged in parallel with one another within the volume of the birefringent medium layer 515. An LC molecule director plane (or an LC director plane) 516 may be a plane formed by or including the LC directors of the LC molecules 512. In the example shown in FIG. 5G, the LC directors in the LC director plane 516 have different orientations, i.e., the orientations of the LC directors vary in the x-axis direction. The Bragg plane 514 may form an angle θ with respect to the LC molecule director plane 516. In the embodiment shown in FIG. 5G, the angle θ may be an acute angle, e.g., 0°<θ<90°. The PVH element 500 including the birefringent medium layer 515 shown in FIG. 5B may function as a transmissive PVH element, e.g., a transmissive PVH grating.

In the embodiment shown in FIG. 5H, the helical axes 518 of helical structures 517 may be tilted with respect to the first surface 515-1 and/or the second surface 515-2 of the birefringent medium layer 515 (or with respect to the thickness direction of the birefringent medium layer 515). For example, the helical axes 518 of the helical structures 517 may have an acute angle or obtuse angle with respect to the first surface 515-1 and/or the second surface 515-2 of the birefringent medium layer 515. In some embodiments, the LC directors of the LC molecule 512 may be substantially orthogonal to the helical axes 518 (i.e., the tilt angle may be substantially zero degree). In some embodiments, the LC directors of the LC molecule 512 may be tilted with respect to the helical axes 518 at an acute angle. The birefringent medium layer 515 may have a vertical periodicity (or pitch) $P_v$. In the embodiment shown in FIG. 5H, an angle θ (not shown) between the LC director plane 516 and the Bragg plane 514 may be substantially 0° or 180°. That is, the LC director plane 516 may be substantially parallel with the Bragg plane 514. In the example shown in FIG. 5H, the orientations of the directors in the molecule director plane 516 may be substantially the same. The PVH element 500 including the birefringent medium layer 515 shown in FIG. 5H may function as a reflective PVH element, e.g., a reflective PVH grating.

In the embodiment shown in FIG. 5G, the birefringent medium layer 515 (or the PVH including the birefringent medium layer 515) may also include a plurality of LC director planes 516 arranged in parallel within the volume of the birefringent medium layer 515. In the embodiment shown in FIG. 5H, an angle θ between the LC director plane 516 and the Bragg plane 514 may be a substantially right angle, e.g., θ=90°. That is, the LC director plane 516 may be substantially orthogonal to the Bragg plane 514. In the example shown in FIG. 5H, the LC directors in the LC director plane 516 may have different orientations. In some embodiments, the PVH element 500 including the birefringent medium layer 515 shown in FIG. 5H may function as a transmissive PVH element, e.g., a transmissive PVH grating.

The PVH element 500 may be configured with an operating wavelength range (or band). For discussion purposes, a light having a wavelength range within the designed operating wavelength range (or band) of the PVH element 500 may also be referred to as a light associated with the operating wavelength range (or band) of the PVH element 500. A light having a wavelength outside of the operating wavelength band of the PVH element 500 may be referred to as a light not associated with the operating wavelength range (or band) of the PVH element 500.

For a circularly polarized light associated with the operating wavelength range, the PVH element 500 may selectively backwardly diffract or transmit (with negligible diffraction) the circularly polarized light, depending on the handedness of the circularly polarized light. In some embodiments, referring to FIGS. 5G and 5H, the handedness of the helical structures 517 may define the polarization selectivity of the PVH element 500 for a circularly polarized light associated with the operating wavelength range. In some embodiments, the PVH element 500 may substantially forwardly or backwardly diffract the circularly polarized light, when the circularly polarized light has a handedness that is the same as the handedness of the helical structures 517, and substantially transmit (e.g., with negligible diffraction) the circularly polarized light, when the circularly polarized light has a handedness that is opposite to the handedness of the helical structures 517.

In some embodiments, depending on the handedness of the helical structures 517 within the PVH element 500, the PVH element 500 may be referred to as a left-handed or right-handed R-PVH grating. For example, a left-handed R-PVH element may be configured to substantially backwardly diffract a left-handed circularly polarized ("LHCP") light associated with the operating wavelength band, and substantially transmit (e.g., with negligible diffraction) a right-handed circularly polarized ("RHCP") light associated with the operating wavelength band. A right-handed R-PVH element may be configured to substantially backwardly diffract an RHCP light associated with the operating wavelength band, and substantially transmit (e.g., with negligible diffraction) an LHCP light associated with the operating wavelength band.

In some embodiments, for a light (e.g., circularly polarized light) having a wavelength outside of the operating wavelength band (or not associated with the operating wavelength band) of the PVH element 500, the PVH element 500 may substantially transmit the light, for example, independent of the polarization of the light (e.g., independent of the handedness of the circularly polarized light).

Figure 6A:
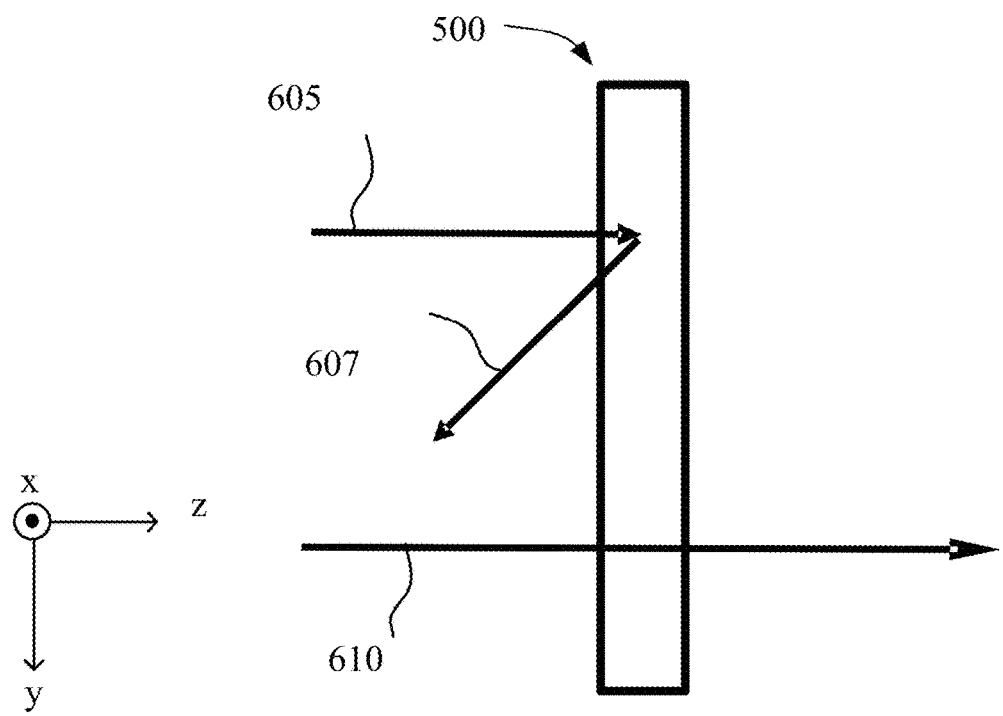
FIG. 6A schematically illustrates diffraction and transmission of the PVH element shown in FIG. 5A functioning as a PVH grating, according to an embodiment of the present disclosure.
Figure 6B:
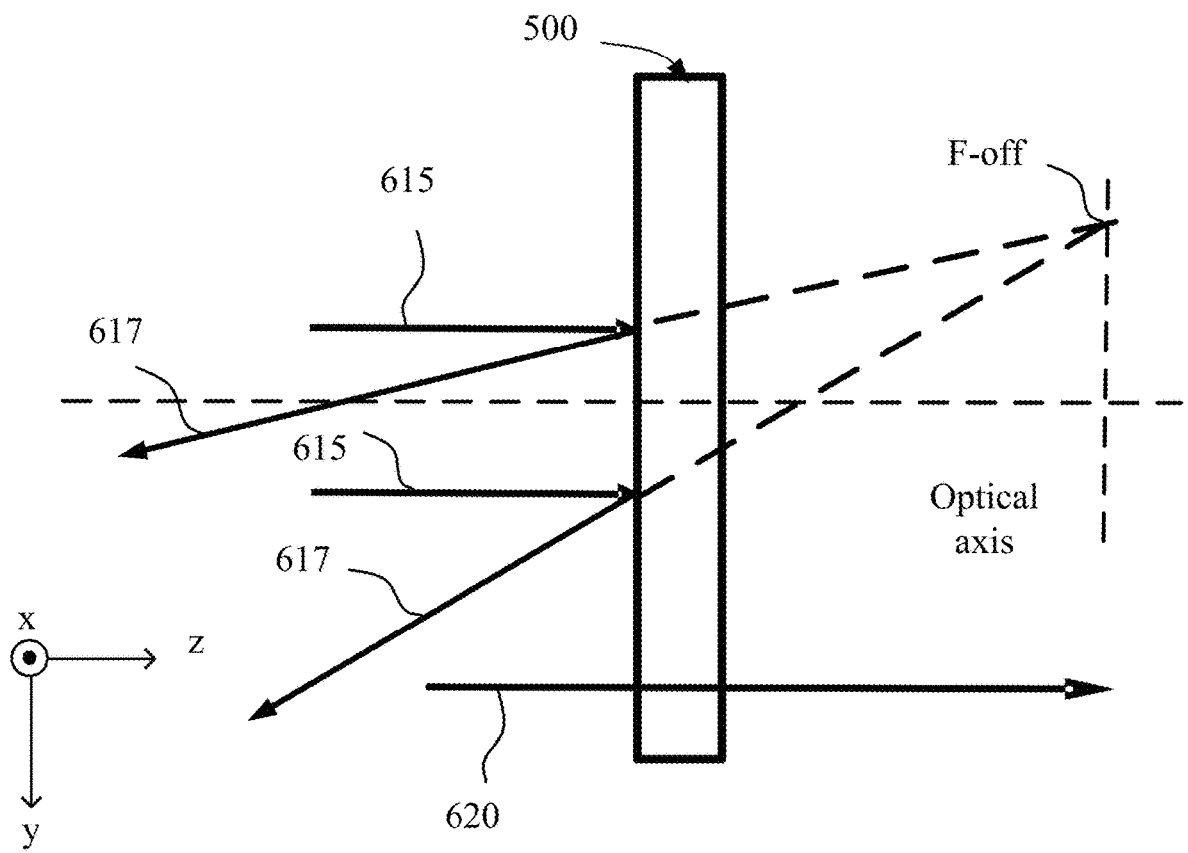
FIG. 6B schematically illustrates diffraction and transmission of the PVH element shown in FIG. 5A functioning as an off-axis focusing PVH lens, according to an embodiment of the present disclosure.

FIG. 6A schematically illustrates diffraction and transmission of the PVH element 500 shown in FIG. 5A functioning as a PVH grating, according to an embodiment of the present disclosure. FIG. 6B schematically illustrates diffraction and transmission of the PVH element 500 shown in FIG. 5A functioning as an off-axis focusing PVH lens, according to an embodiment of the present disclosure. For discussion purposes, the PVH element 500 may be a left-handed and reflective PVH element, with the operating wavelength band in the IR spectrum.

As shown in FIG. 6A, when the PVH element 500 functions as a PVH grating (also referred to as 500), the PVH grating 500 may substantially backwardly diffract an LHCP light (e.g., LHCP IR light) 605 associated with the operating wavelength band of the PVH grating 500 as a diffract light 607. The PVH grating 500 may substantially transmit, with negligible diffraction, a light (e.g., visible light) 610 having a wavelength range outside of the operating wavelength band. In some embodiments, the PVH grating 500 may substantially maintain a polarization of a light diffracted by or transmitted therethrough. For example, the diffracted light 607 may be an LHCP light. In some embodiments, the PVH grating 500 may change a polarization of a light diffracted by or transmitted therethrough. Although not shown, in some embodiments, the PVH grating 500 may be a transmissive PVH grating that substantially forwardly diffracts an LHCP light (e.g., LHCP IR light) associated with the operating wavelength band, and substantially transmits, with negligible diffraction, a light (e.g., visible light) having a wavelength range outside of the operating wavelength band.

In the embodiment shown in FIG. 5B, the PVH element 500 may function as a PVH lens, such as an off-axis focusing PVH lens (also referred to as 500). For discussion purposes, the off-axis focusing PVH lens 500 shown in FIG. 5B may be a diverging lens. For discussion purposes, an LHCP light (e.g., LHCP IR light) 615 associated with the operating wavelength band may be an on-axis light, and may be normally incident onto the off-axis focusing PVH lens 500. As shown in FIG. 5B, the off-axis focusing PVH lens 500 may substantially backwardly diffract and diverge the LHCP light (e.g., LHCP IR light) 615 as a divergent light 617. The extending lines of rays of the divergent light 617 may intersect at an off-axis focal point F-off. The off-axis focal point F-off may be located within a focal plane of the off-axis focusing PVH lens 500, and may be offset from an intersecting point between the focal plane and the optical axis of the off-axis focusing PVH lens 500. The off-axis focusing PVH lens 500 may substantially transmit, with negligible diffraction, a light (e.g., visible light) 620 having a wavelength range outside of the operating wavelength band. In some embodiments, the PVH lens 500 may substantially maintain a polarization of a light diffracted by or transmitted therethrough. For example, the diffracted light 617 may be an LHCP light, having the same polarization as the incident light 615. In some embodiments, the off-axis focusing PVH lens 500 may change a polarization of a light diffracted by or transmitted therethrough. For example, the diffracted light 617 may be an elliptically polarized light.

Although not shown, in some embodiments, the off-axis focusing PVH lens 500 may be a transmissive PVH lens that substantially forwardly diffracts and diverges an LHCP light (e.g., LHCP IR light) associated with the operating wavelength band, and substantially transmits, with negligible diffraction, a light (e.g., visible light) having a wavelength range outside of the operating wavelength band. In some embodiments, the off-axis focusing PVH lens 500 may also be configured as a converging lens.

The disclosed optical systems for object tracking may have numerous applications in a large variety of fields, e.g., near-eye displays ("NEDs"), head-up displays ("HUDs"), head-mounted displays ("HMDs"), smart phones, laptops, televisions, vehicles, etc. For example, the disclosed optical systems may be implemented in various systems for augmented reality ("AR"), virtual reality ("VR"), and/or mixed reality ("MR") applications, to determine what content to provide to the user, to solve the vergence-accommodation conflict, to enable pupil steered AR, VR, and/or MR display systems (including, but not limited to, holographic near eye displays, retinal projection eyewear, and wedged waveguide displays), etc. The disclosed optical systems may be implemented in sensing modules to extend the detecting range of the sensors, increase detecting resolution or accuracy of the sensors, and/or reduce the signal processing time.

Figure 7A:
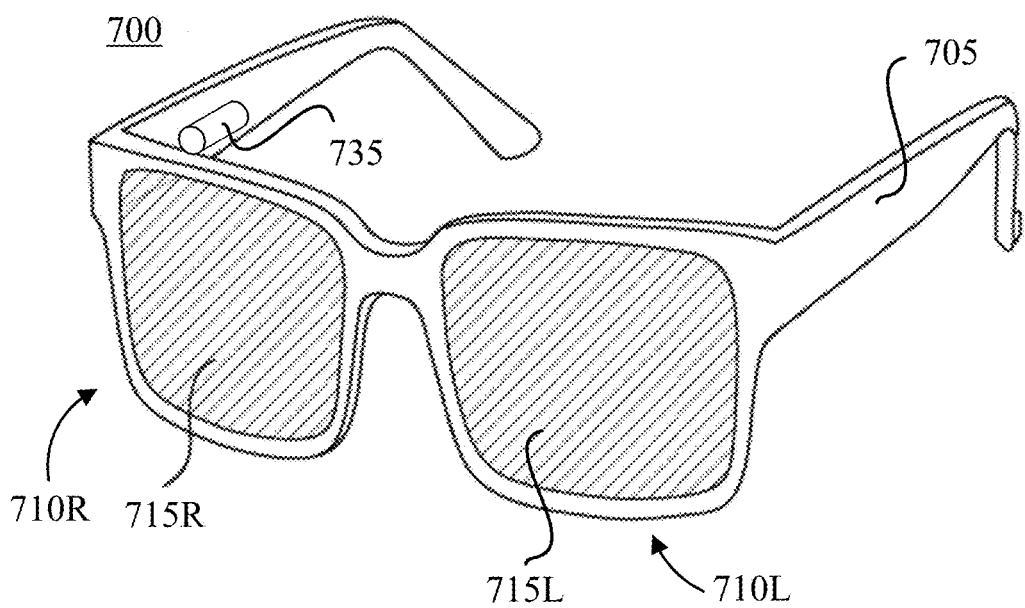
FIG. 7A is a schematic diagram of a near-eye display ("NED"), according to an embodiment of the disclosure.
Figure 7B:
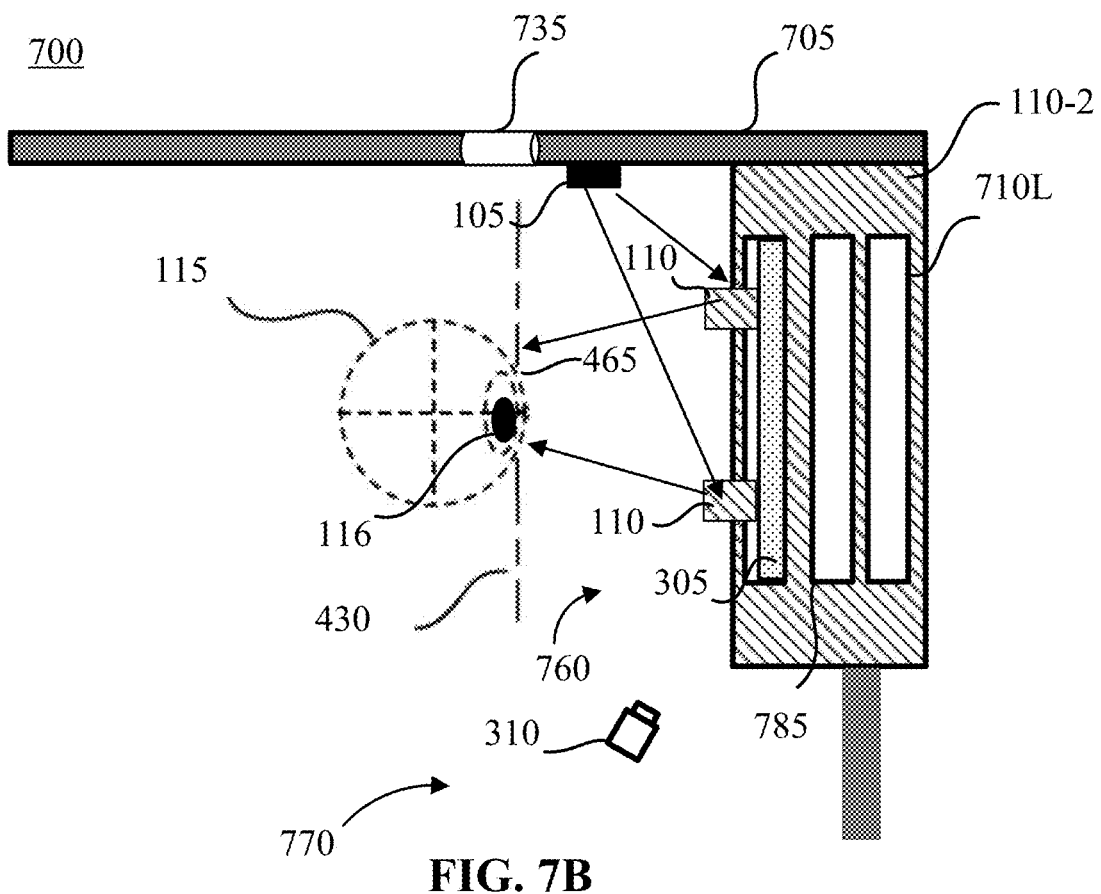
FIG. 7B is a cross sectional view of a half of the NED shown in FIG. 7A, according to an embodiment of the disclosure.

FIG. 7A illustrates a schematic diagram of a near-eye display ("NED") 700 according to an embodiment of the disclosure. FIG. 7B is a cross-sectional view of half of the NED 700 shown in FIG. 7A according to an embodiment of the disclosure. For purposes of illustration, FIG. 7B shows the cross-sectional view associated with a left-eye display system 710L. The NED 700 may include a controller (e.g., the controller 325), which is not shown in FIG. 7A or 7B. As shown in FIGS. 7A and 7B, the NED 700 may include a frame 705 configured to mount to a user's head. The frame 705 is merely an example structure to which various components of the NED 700 may be mounted. Other suitable fixtures may be used in place of or in addition to the frame 705. The NED 700 may include right-eye and left-eye display systems 710R and 710L mounted to the frame 705. The NED 700 may function as a VR device, an AR device, an MR device, or any combination thereof. In some embodiments, when the NED 700 functions as an AR or an MR device, the right-eye and left-eye display systems 710R and 710L may be entirely or partially transparent from the perspective of the user, which may provide the user with a view of a surrounding real-world environment. In some embodiments, when the NED 700 functions as a VR device, the right-eye and left-eye display systems 710R and 710L may be opaque, such that the user may be immersed in the VR imagery based on computer-generated images.

The right-eye and left-eye display systems 710R and 710L may include image display components configured to project computer-generated virtual images into left and right display windows 715L and 715R in a field of view ("FOV"). The right-eye and left-eye display systems 710R and 710L may be any suitable display systems, such as the light guide display assembly 450 shown in FIG. 4. For illustrative purposes, FIG. 7A shows that the right-eye and left-eye display systems 710R and 710L may include a light source assembly (e.g., a projector) 735 coupled to the frame 705. The projector 735 may generate an image light representing a virtual image.

As shown in FIG. 7B, the NED 700 may also include a lens system 785 and an object tracking system 770 (e.g., eye tracking system and/or face tracking system). In some embodiments, the lens system 785 may be disposed between the object tracking system 770 and the left-eye display system 710L. The lens system 785 may be configured to guide the image light output from the left-eye display system 710L to an exit pupil 465. The exit pupil 465 may be a location where an eye pupil 116 of the eye 115 of the user is positioned in an eye-box region 430 of the left-eye display system 710L. In some embodiments, the lens system 785 may be configured to correct aberrations in the image light output from the left-eye display system 710L, magnify the image light output from the left-eye display system 710L, or perform another type of optical adjustment to the image light output from the left-eye display system 710L. The lens system 785 may include multiple optical elements, such as lenses, waveplates, reflectors, etc. In some embodiments, the lens system 785 may include a pancake lens configured to fold the optical path, thereby reducing the back focal distance in the NED 700.

The object tracking system 770 may be any embodiment of the object tracking system disclosed herein, such as the object tracking system 300 shown in FIG. 3A, or the object tracking system 470 shown in FIG. 4. The object tracking system 770 may include an illumination system or assembly 760, which may be any embodiment of the illumination system disclosed herein, such as the illumination system 100 shown in FIGS. 1A-1C, the illumination system 160 shown in FIG. 1D, the illumination system 170 shown in FIG. 1E, the illumination system 200 shown in FIG. 2A, the illumination system 230 shown in FIG. 2B, the illumination system 260 shown in FIG. 2C, or the illumination system 270 shown in FIGS. 2D-2F. With the illumination system or assembly 760, an in-field illumination may be provided to the eye 115 and/or face of the user with a uniform and large illumination area. With the object tracking system 770, the NED 700 may provide enhanced tracking accuracy and tracking range for eye tracking and/or face tracking. Information obtained during eye tracking and/or face tracking may be used for determining the type of information to be presented to the user of the NED 700 and/or the arrangement of the content displayed on a display screen of the NED 700, addressing the vergence-accommodation conflict, and enhancing display quality and performance of the NED 700. Accordingly, the user experience of the NED 700 may be enhanced.

For illustrative purposes, FIG. 7B shows that the object tracking system 770 may be similar to the object tracking system 300 shown in FIG. 3A. For example, the object tracking system 770 may include the light source 105, two illuminators 110, the signal light deflecting element 305, and the optical sensor 310. For the simplicity of illustration, not all elements shown in FIG. 3A are shown in FIG. 7B. Detailed descriptions of the light propagation and other elements can refer to the above descriptions rendered in connection with FIG. 3A. A controller (e.g., the controller 325 shown in FIG. 3A) may generate different perspective images of the eye 115 based on the tracking signals generated by the optical sensor 310.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An illumination system, comprising:
a light source configured to emit an infrared light;
a substrate; and a plurality of light deflecting elements coupled with the substrate and configured to deflect the infrared light to illuminate an object, wherein the substrate is a light guide, and the illumination system further includes an in-coupling element coupled with the light guide, wherein the in-coupling element is configured to couple the infrared light emitted by the light source into the light guide to propagate inside the light guide, wherein the plurality of light deflecting elements are coupled with the light guide at a plurality of portions of the light guide along a longitudinal direction of the light guide, and are configured to couple the infrared light propagating inside the light guide out of the light guide to illuminate the object, and wherein the illumination system further includes a light splitting element coupled with the light guide, and configured to split the infrared light in-coupled by the in-coupling element into a plurality of infrared lights propagating toward the plurality of light deflecting elements.

2. The illumination system of claim 1, wherein the light deflecting elements are configured to deflect the infrared light to illuminate the object, and substantially transmit a visible light.

3. The illumination system of claim 1, wherein the light splitting element includes a plurality of one-dimensional gratings or one or more two-dimensional gratings.

4. The illumination system of claim 1, further comprising a retardation film stacked with a light deflecting element of the plurality of light deflecting elements and configured to control a polarization of the infrared light out-coupled by the light deflecting element for illuminating the object.

5. The illumination system of claim 1, further comprising a beam shaping element stacked with a light deflecting element of the plurality of light deflecting elements, and configured to convert the infrared light out-coupled by the light deflecting element into a structured infrared light for illuminating the object.

6. The illumination system of claim 5, wherein the structured infrared light includes at least one of an intensity-based structured infrared light or a polarization-based structured infrared light.

7. The illumination system of claim 5, wherein the light deflecting element and the beam shaping element are integrally formed in a single hologram.

8. The illumination system of claim 1, wherein the light deflecting elements include at least one of a hologram optical element, a surface relief element, or a polarization volume hologram element.

9. The illumination system of claim 1, wherein the light deflecting elements include at least one diffractive optical element.

10. The illumination system of claim 1, wherein the light deflecting elements include at least one of a grating or an off-axis focusing lens.

11. An object tracking system, comprising:
    an illumination system comprising:
        a light source configured to emit an infrared light;
        a substrate; and
        a plurality of light deflecting elements coupled with the substrate and configured to deflect the infrared light to illuminate an object; and
    an optical sensor configured to receive the infrared light reflected by the object and generate an image of the object based on the infrared light reflected by the object, wherein the substrate is a light guide, and the illumination system further includes an in-coupling element coupled with the light guide, wherein the in-coupling element is configured to couple the infrared light emitted by the light source into the light guide to propagate inside the light guide, wherein the plurality of light deflecting elements are coupled with the light guide at a plurality of portions of the light guide along a longitudinal direction of the light guide, and are configured to couple the infrared light propagating inside the light guide out of the light guide to illuminate the object, and wherein the illumination system further includes a light splitting element coupled with the light guide, and configured to split the infrared light in-coupled by the in-coupling element into a plurality of infrared lights propagating toward the plurality of light deflecting elements.

12. The object tracking system of claim 11, further comprising:
    a retardation film coupled with a light deflecting element of the plurality of light deflecting elements, and configured to control a polarization of the infrared light deflected by the light deflecting element for illuminating the object.

13. The object tracking system of claim 11, further comprising: a beam shaping element stacked with a light deflecting element of the plurality of light deflecting elements, and configured to convert the infrared lights out-coupled by the light deflecting element into a structured infrared light for illuminating the object.

14. The object tracking system of claim 13, wherein the structured infrared light includes at least one of an intensity-based structured infrared light or a polarization-based structured infrared light.

15. The object tracking system of claim 13, wherein the light deflecting element and the beam shaping element are integrally formed in a single hologram.

* * * * *